(12) United States Patent
Maruoka

(10) Patent No.: US 11,835,812 B2
(45) Date of Patent: Dec. 5, 2023

(54) DISPLAY SYSTEM AND METHOD OF DISPLAY SYSTEM

(71) Applicant: Japan Display Inc., Tokyo (JP)

(72) Inventor: Yoshio Maruoka, Tokyo (JP)

(73) Assignee: Japan Display Inc., Tokyo (JP)

( * ) Notice: Subject to any disclaimer, the term of this patent is extended or adjusted under 35 U.S.C. 154(b) by 33 days.

(21) Appl. No.: 17/717,535

(22) Filed: Apr. 11, 2022

(65) Prior Publication Data

US 2022/0334421 A1    Oct. 20, 2022

(30) Foreign Application Priority Data

Apr. 19, 2021   (JP) ................................ 2021-070681

(51) Int. Cl.
*G02F 1/1334* (2006.01)
*G02F 1/13357* (2006.01)
*G02F 1/1343* (2006.01)

(52) U.S. Cl.
CPC ...... *G02F 1/1334* (2013.01); *G02F 1/133611* (2013.01); *G02F 1/133615* (2013.01); *G02F 1/134336* (2013.01)

(58) Field of Classification Search
CPC ............ G02F 1/1334; G02F 1/133611; G02F 1/133615; G02F 1/134336
See application file for complete search history.

(56) References Cited

U.S. PATENT DOCUMENTS

| | | | | |
|---|---|---|---|---|
| 6,211,931 | B1* | 4/2001 | Fukao | G02F 1/1334 |
| | | | | 349/86 |
| 2005/0068468 | A1* | 3/2005 | Yamazaki | G09G 3/3413 |
| | | | | 349/151 |
| 2011/0134150 | A1* | 6/2011 | Imamura | G06F 3/1446 |
| | | | | 345/87 |
| 2020/0310175 | A1 | 10/2020 | Okuyama et al. | |
| 2021/0397051 | A1 | 12/2021 | Ikeda et al. | |

* cited by examiner

*Primary Examiner* — Edward J Glick
*Assistant Examiner* — David Y Chung
(74) *Attorney, Agent, or Firm* — Maier & Maier, PLLC

(57) ABSTRACT

A display system includes a lighting device, a correction coefficient generating circuit receiving a plurality of image data including first image data and second image data, generating a first correction coefficient based on a brightness of the first image data and generating a second correction coefficient based on a brightness of the second image data, and the first image data corresponding to a first image and a second image data corresponding to a second image adjacent to the first image and located on the opposite side of the lighting device, a multiplication circuit generating first corrected image data using the first image data and the first correction coefficient, and generating second corrected image data using the second image data and the second correction coefficient, and a display drive control unit transmitting the first and the second corrected image data to the display panel.

14 Claims, 65 Drawing Sheets

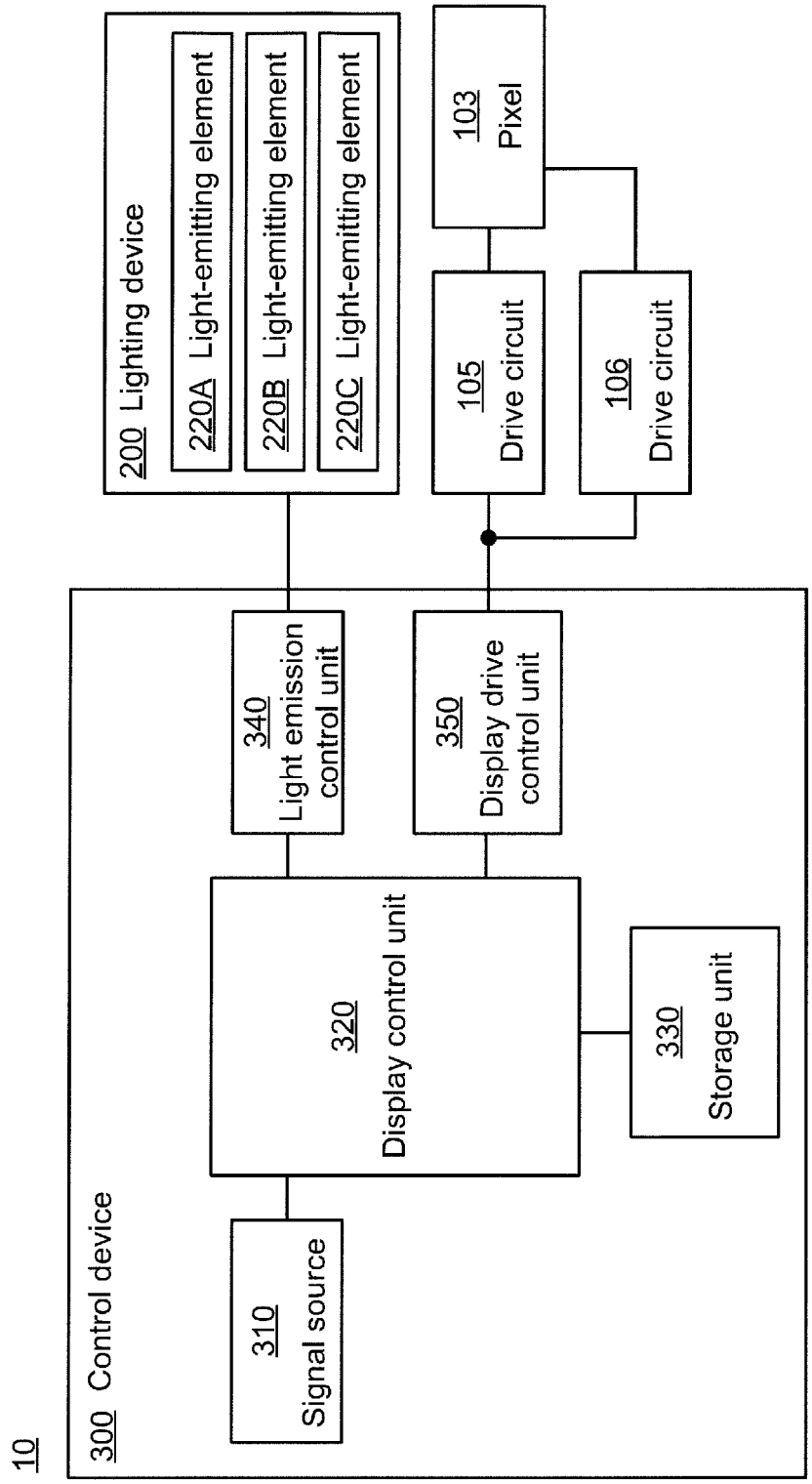

FIG. 17B

| Y=1 | Y=2 | Y=3 | Y=4 | Y=5 | Y=6 | Y=7 | Y=8 | Y=9 | Y=10 | |
|---|---|---|---|---|---|---|---|---|---|---|
| 1.0 | 1.0 | 1.0 | 1.0 | 1.0 | 1.0 | 1.0 | 1.0 | 1.0 | 1.0 | X=16 |
| 1.0 | 1.0 | 1.0 | 1.0 | 1.0 | 1.0 | 1.0 | 1.0 | 1.0 | 1.0 | X=15 |
| 1.0 | 1.0 | 1.0 | 1.0 | 1.0 | 1.0 | 1.0 | 1.0 | 1.0 | 1.0 | X=14 |
| 0.9 | 0.9 | 0.9 | 0.9 | 0.9 | 0.9 | 0.9 | 0.9 | 0.9 | 0.9 | X=13 |
| 0.9 | 0.9 | 0.9 | 0.9 | 0.9 | 0.9 | 0.9 | 0.9 | 0.9 | 0.9 | X=12 |
| 0.9 | 0.9 | 0.9 | 0.9 | 0.9 | 0.9 | 0.9 | 0.9 | 0.9 | 0.9 | X=11 |
| 0.9 | 0.9 | 0.9 | 0.9 | 0.9 | 0.9 | 0.9 | 0.9 | 0.9 | 0.9 | X=10 |
| 0.8 | 0.8 | 0.8 | 0.8 | 0.8 | 0.8 | 0.8 | 0.8 | 0.8 | 0.8 | X=9 |
| 0.8 | 0.8 | 0.8 | 0.8 | 0.8 | 0.8 | 0.8 | 0.8 | 0.8 | 0.8 | X=8 |
| 0.8 | 0.8 | 0.8 | 0.8 | 0.8 | 0.8 | 0.8 | 0.8 | 0.8 | 0.8 | X=7 |
| 0.8 | 0.8 | 0.8 | 0.8 | 0.8 | 0.8 | 0.8 | 0.8 | 0.8 | 0.8 | X=6 |
| 0.7 | 0.7 | 0.7 | 0.7 | 0.7 | 0.7 | 0.7 | 0.7 | 0.7 | 0.7 | X=5 |
| 0.7 | 0.7 | 0.7 | 0.7 | 0.7 | 0.7 | 0.7 | 0.7 | 0.7 | 0.7 | X=4 |
| 0.7 | 0.7 | 0.7 | 0.7 | 0.7 | 0.7 | 0.7 | 0.7 | 0.7 | 0.7 | X=3 |
| 0.6 | 0.6 | 0.6 | 0.6 | 0.6 | 0.6 | 0.6 | 0.6 | 0.6 | 0.6 | X=2 |
| 0.6 | 0.6 | 0.6 | 0.6 | 0.6 | 0.6 | 0.6 | 0.6 | 0.6 | 0.6 | X=1 |

FIG. 18B

| | Y=1 | Y=2 | Y=3 | Y=4 | Y=5 | Y=6 | Y=7 | Y=8 | Y=9 | Y=10 | |
|---|---|---|---|---|---|---|---|---|---|---|---|
| | 1.0 | 1.0 | 1.1 | 1.1 | 1.1 | 1.1 | 1.1 | 1.1 | 1.0 | 1.0 | X=16 |
| | 1.0 | 1.0 | 1.1 | 1.1 | 1.1 | 1.1 | 1.1 | 1.1 | 1.0 | 1.0 | X=15 |
| | 1.0 | 1.0 | 1.1 | 1.1 | 1.1 | 1.1 | 1.1 | 1.1 | 1.0 | 1.0 | X=14 |
| | 0.9 | 0.9 | 0.9 | 0.9 | 0.9 | 0.9 | 0.9 | 0.9 | 0.9 | 0.9 | X=13 |
| | 0.9 | 0.9 | 0.9 | 0.9 | 0.9 | 0.9 | 0.9 | 0.9 | 0.9 | 0.9 | X=12 |
| Coefficient + 0.1 | 0.9 | 0.9 | 0.9 | 0.9 | 0.9 | 0.9 | 0.9 | 0.9 | 0.9 | 0.9 | X=11 |
| | 0.9 | 0.9 | 0.9 | 0.9 | 0.9 | 0.9 | 0.9 | 0.9 | 0.9 | 0.9 | X=10 |
| | 0.8 | 0.8 | 0.8 | 0.8 | 0.8 | 0.8 | 0.8 | 0.8 | 0.8 | 0.8 | X=9 |
| | 0.8 | 0.8 | 0.8 | 0.8 | 0.8 | 0.8 | 0.8 | 0.8 | 0.8 | 0.8 | X=8 |
| | 0.8 | 0.8 | 0.8 | 0.8 | 0.8 | 0.8 | 0.8 | 0.8 | 0.8 | 0.8 | X=7 |
| | 0.8 | 0.8 | 0.8 | 0.8 | 0.8 | 0.8 | 0.8 | 0.8 | 0.8 | 0.8 | X=6 |
| | 0.7 | 0.7 | 0.7 | 0.7 | 0.7 | 0.7 | 0.7 | 0.7 | 0.7 | 0.7 | X=5 |
| | 0.7 | 0.7 | 0.7 | 0.7 | 0.7 | 0.7 | 0.7 | 0.7 | 0.7 | 0.7 | X=4 |
| | 0.7 | 0.7 | 0.7 | 0.7 | 0.7 | 0.7 | 0.7 | 0.7 | 0.7 | 0.7 | X=3 |
| | 0.6 | 0.6 | 0.6 | 0.6 | 0.6 | 0.6 | 0.6 | 0.6 | 0.6 | 0.6 | X=2 |
| | 0.6 | 0.6 | 0.6 | 0.6 | 0.6 | 0.6 | 0.6 | 0.6 | 0.6 | 0.6 | X=1 |

D2 direction correction coefficient generation of corrected image data in white box

FIG. 19B

|   | Y=1 | Y=2 | Y=3 | Y=4 | Y=5 | Y=6 | Y=7 | Y=8 | Y=9 | Y=10 |      |
|---|---|---|---|---|---|---|---|---|---|---|---|
|   | 1.0 | 1.0 | 1.1 | 1.1 | 1.1 | 1.1 | 1.1 | 1.1 | 1.0 | 1.0 | X=16 |
|   | 1.0 | 1.0 | 1.1 | 1.1 | 1.1 | 1.1 | 1.1 | 1.1 | 1.0 | 1.0 | X=15 |
|   | 1.0 | 1.0 | 1.1 | 1.1 | 1.1 | 1.1 | 1.1 | 1.1 | 1.0 | 1.0 | X=14 |
|   | 0.9 | 0.9 | 0.7 | 0.8 | 0.9 | 0.9 | 0.8 | 0.7 | 0.9 | 0.9 | X=13 |
|   | 0.9 | 0.9 | 0.7 | 0.8 | 0.9 | 0.9 | 0.8 | 0.7 | 0.9 | 0.9 | X=12 |
|   | 0.9 | 0.9 | 0.7 | 0.8 | 0.9 | 0.9 | 0.8 | 0.7 | 0.9 | 0.9 | X=11 |
|   | 0.9 | 0.9 | 0.7 | 0.8 | 0.9 | 0.9 | 0.8 | 0.7 | 0.9 | 0.9 | X=10 |
|   | 0.8 | 0.8 | 0.6 | 0.7 | 0.8 | 0.8 | 0.7 | 0.6 | 0.8 | 0.8 | X=9  |
|   | 0.8 | 0.8 | 0.7 | 0.8 | 0.8 | 0.8 | 0.8 | 0.7 | 0.8 | 0.8 | X=8  |
|   | 0.8 | 0.8 | 0.7 | 0.8 | 0.8 | 0.8 | 0.8 | 0.7 | 0.8 | 0.8 | X=7  |
|   | 0.8 | 0.8 | 0.7 | 0.8 | 0.8 | 0.8 | 0.8 | 0.7 | 0.8 | 0.8 | X=6  |
|   | 0.7 | 0.7 | 0.6 | 0.7 | 0.7 | 0.7 | 0.7 | 0.6 | 0.7 | 0.7 | X=5  |
|   | 0.7 | 0.7 | 0.6 | 0.7 | 0.7 | 0.7 | 0.7 | 0.6 | 0.7 | 0.7 | X=4  |
|   | 0.7 | 0.7 | 0.7 | 0.7 | 0.7 | 0.7 | 0.7 | 0.7 | 0.7 | 0.7 | X=3  |
|   | 0.6 | 0.6 | 0.6 | 0.6 | 0.6 | 0.6 | 0.6 | 0.6 | 0.6 | 0.6 | X=2  |
|   | 0.6 | 0.6 | 0.6 | 0.6 | 0.6 | 0.6 | 0.6 | 0.6 | 0.6 | 0.6 | X=1  |

Coefficient -0.2 (left and right)
Coefficient -0.1 (left and right)

D1 direction correction coefficient igeneration of corrected image data in white box

DISPLAY SYSTEM AND METHOD OF DISPLAY SYSTEM

CROSS-REFERENCE TO RELATED APPLICATIONS

This application is based upon and claims the benefit of priority from the prior Japanese Patent Application No. 2021-070681 filed on Apr. 19, 2021, the entire contents of which are incorporated herein by reference.

FIELD

An embodiment of the present invention relates to a display system and a method of the display system.

BACKGROUND

In recent years, a polymer dispersed liquid crystal (PDLC system) type display device has attracted attention. The PDLC is in an opaque white state when no voltage is applied, for example, and becomes transparent when a voltage is applied. A PDLC type display device (hereinafter referred to as PDLC display device) utilizing this feature can realize, for example, lighting and shading of a glass window by turning the power on and off. The PDLC display device is capable of realizing a wide viewing angle without using a polarization plate.

SUMMARY

A display system includes a display panel with a display area, a lighting device located facing one side of the display area and emitting light to the display panel, a correction coefficient generating circuit receiving a plurality of image data including first image data and second image data, generating a first correction coefficient based on a brightness of the first image data and generating a second correction coefficient based on a brightness of the second image data, and the first image data corresponding to a first image and the second image data corresponding to a second image adjacent to the first image and located on the opposite side of the lighting device to the first image, a multiplication circuit receiving at least the first image data and the second image data, receiving at least the first correction coefficient and the second correction coefficient from the correction coefficient generating circuit, generating first corrected image data using the first image data and the first correction coefficient, and generating second corrected image data using the second image data and the second correction coefficient, and a display drive control unit receiving the first corrected image data and the second corrected image data from the multiplication circuit, and transmitting the first corrected image data and the second corrected image data to the display panel.

A method for driving a display system includes a display system including a display panel with a display area and a lighting device located facing one side of the display area and emitting light to the display panel, the method including receiving a plurality of image data including first image data and second image data, the first image data corresponding to a first image and a second image data located on the opposite side of the lighting device to the first image and corresponding to the second image adjacent to the first image, generating a first correction coefficient based on a brightness of the first image data, and generating a second correction coefficient based on a brightness of the second image data, generating first corrected image data using the first image data and the first correction coefficient, generating second corrected image data using the second image data and the second correction coefficient, and displaying an image corresponding to the first corrected image data and the second corrected image data to the display panel.

BRIEF DESCRIPTION OF DRAWINGS

FIG. 3 is a block diagram showing a configuration of a display system according to an embodiment of the present invention;

FIG. 17B is a diagram showing correction coefficients;

FIG. 18B is a diagram showing correction coefficients corresponding to image data in the correction area of FIG. 18A;

FIG. 19B is a diagram showing correction coefficients corresponding to image data in the correction area of FIG. 19A;

DESCRIPTION OF EMBODIMENTS

Figure 1:
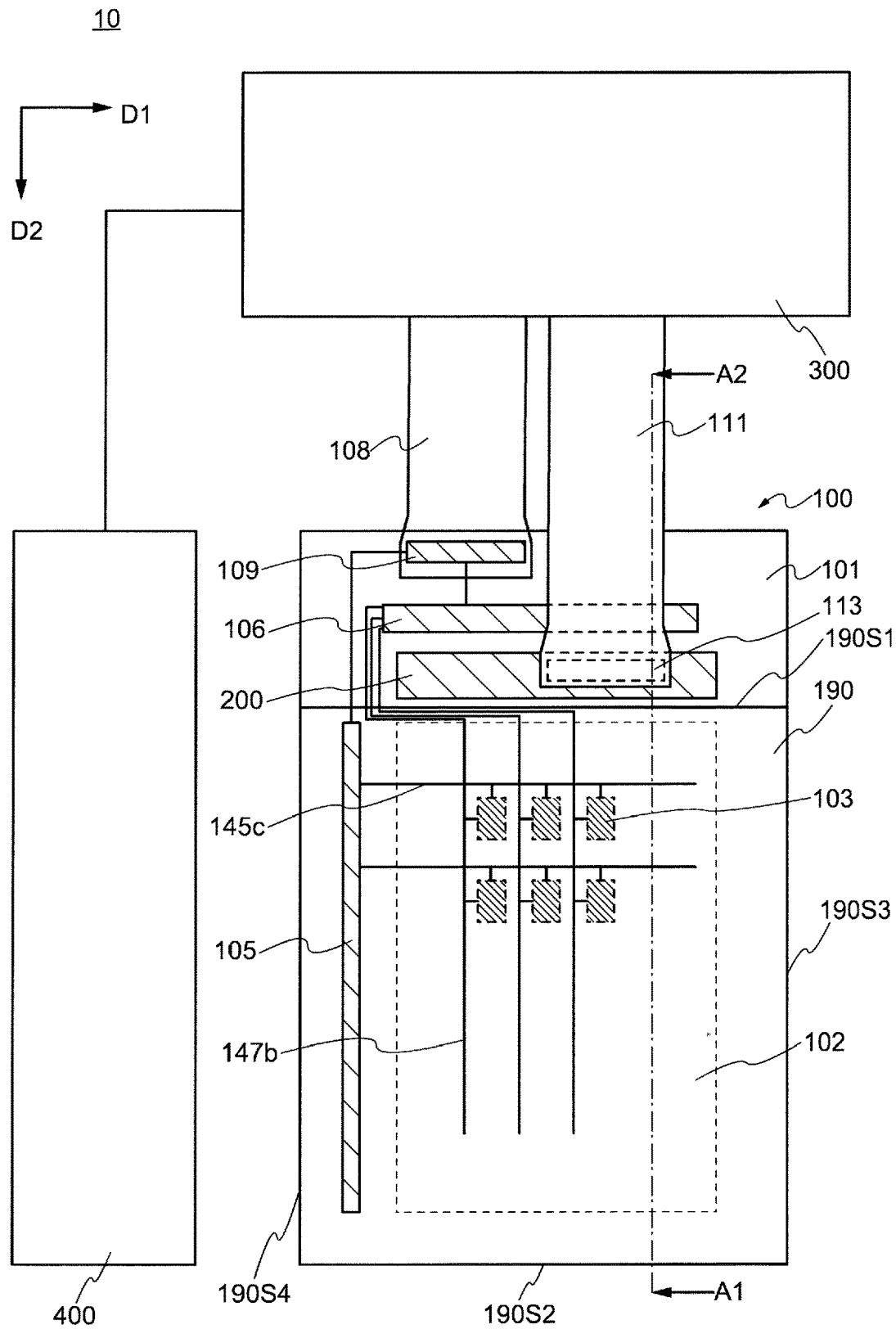
FIG. 1 is a plan view showing a configuration of a display system according to an embodiment of the present invention.

Embodiments of the present invention will be described below with reference to the drawings and the like. However, the present invention can be implemented in many different modes and should not be construed as being limited to the description of the following embodiments. For the sake of clarity of explanation, although the drawings may be schematically represented with respect to widths, thicknesses, shapes, configurations, and the like of the respective portions in comparison with actual embodiments, they are merely examples and do not limit the interpretation of the present invention. In addition, in the present specification and the drawings, the uppercase or lowercase letters of the alphabet are used when each of a plurality of identical or similar configurations is distinguished from each other. The letters "first" and "second" appended to each element are convenient labels used to distinguish each element and have no further meaning unless otherwise stated.

Furthermore, in the detailed description of the present invention, when defining the positional relationship between one component and another component, the positional relationship may be described as "above" or "below". The terms "above" and "below" include not only the case of being located directly above or below a component but also the case of further interposing other components therebetween, unless otherwise stated.

The display system according to an embodiment of the present invention assumes a display system using a drive method of a field sequential drive method. A display panel provided in the display system according to an embodiment of the present invention is exemplified by a liquid crystal display panel using a polymer dispersed liquid crystal. In an embodiment of the present invention, the frame is, as an example, a period for displaying an image by writing voltages corresponding to image signals for one screen to a display device.

A PDLC display device is a display device that guides light from an edge of a display device (hereinafter referred to as edge) using, for example, a light source called sidelight type, side edge type, or edge light type. When the drive method of the field sequential drive method is used in the PDLC display device, a color display can be performed without using a color filter. However, when the field sequential drive method is used in the PDLC display device, light (incident light) guided from the edge attenuates from the edge of the side closer to the light source toward the edge of the side farther from the light source. Consequently, the brightness of a displayed image decreases from the edge closer toward the light source to the edge farther from the light source. With decreasing brightness, display unevenness due to the decreasing brightness becomes a problem. In an image in which different colors are displayed adjacent to each other, coloring due to differences in brightness in the vicinity of a boundary between the image in which different colors are displayed adjacent to each other becomes a problem.

It is an object of the present invention to provide a display device capable of suppressing display unevenness or coloring, and a method for driving the display device.

In a number of embodiments described below, a display device capable of suppressing display unevenness or coloring, and a method for driving the display device are exemplified.

1. First Embodiment 1-1. Configuration of Display System 10

Figure 2:
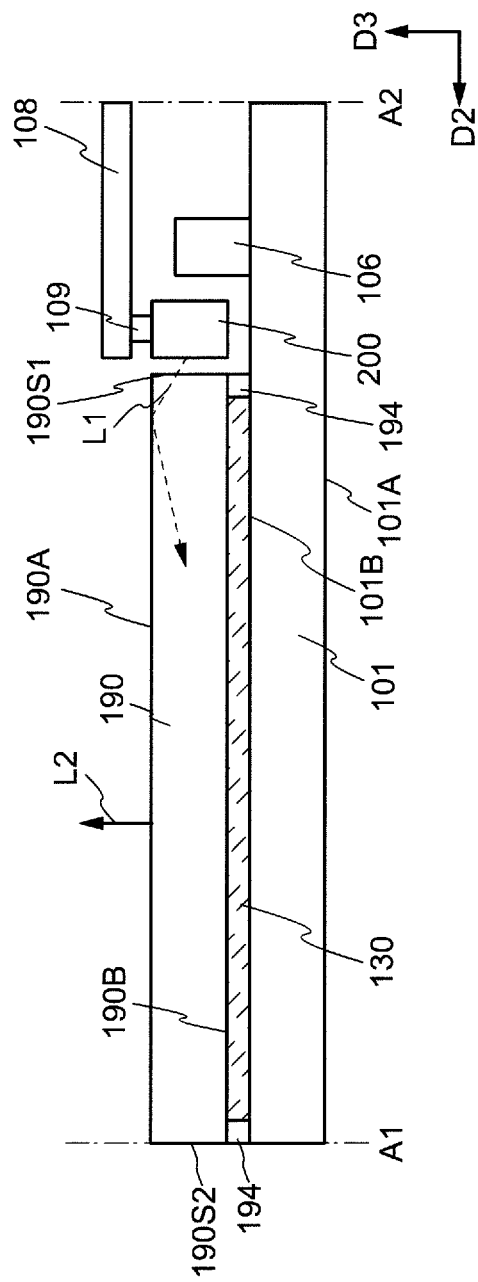
FIG. 2 is an end cross-sectional view showing a cross-sectional structure along a line A1-A2 shown in FIG. 1.

FIG. 1 is a schematic plan view showing a configuration of a display system 10. FIG. 2 is an end cross-sectional view showing a cross-sectional structure along a line A1-A2 shown in FIG. 1. FIG. 3 is a block diagram showing a configuration of the display system 10. The configuration of the display system 10 is not limited to the configuration shown in FIG. 1 to FIG. 3.

As shown in FIG. 1, the display system 10 includes a display panel 100, a lighting device 200, a control device 300, and a power supply device 400.

The display panel 100 has a substrate 101, a display area 102, a pixel 103, a drive circuit 105, a drive circuit 106, a flexible printed board 108, a terminal part 109, a flexible printed board 111, a terminal part 113, and a substrate 190.

The drive circuit 105 has a function as a gate driver. The drive circuit 106 has a function as a source driver. A plurality of pixels 103 is arranged apart in a grid pattern in the display area 102. The pixel 103 functions as a component for displaying an image. Specifically, the pixel 103 includes a liquid crystal element 130 described later. The liquid crystal element 130 has a function of transmitting or scattering light. A scan line 145c is connected to the drive circuit 105. A signal line 147b is connected to the drive circuit 106. The pixel 103 is connected to the scan line 145c and the signal line 147b.

The lighting device 200 includes a light-emitting element 220 (FIG. 3). The light-emitting element 220 includes a plurality of light-emitting elements 220 (a light-emitting element 220A (FIG. 3), a light-emitting element 220B (FIG. 3), and a light-emitting element 220C (FIG. 3)). The light-emitting element 220 is, for example, a light-emitting diode (LED). The light-emitting element 220 incidents light on the substrate 190, and the incident light illuminates the display panel 100.

The control device 300 includes a computing device and a memory device. The computing device is, for example, a CPU (Central Processing Unit), an ASIC (Application Specific Integrated Circuit), or a FPGA (Field-Programmable Gate Array). The memory device is, for example, a DRAM (Dynamic Random Access Memory), an SSD (Solid State Drive), or a hard disk. The Control device 300 is connected to the display panel 100 at the terminal part 109 via the flexible printed board 108. The control device 300 is connected to the lighting device 200 at the terminal part 113 via the flexible printed board 111.

The power supply device 400, for example, generates power and supplies the generated power to the display panel 100, the lighting device 200, and the control device 300. The power supply device 400 may include, for example, a lithium-ion battery. By including the power supply device 400 with a lithium-ion battery, the power generated by the power supply device 400 can be stored in the lithium-ion battery.

In the present embodiment, as shown in FIG. 2, the lighting device 200 faces a first side 190S1 of the substrate 190. The lighting device 200 irradiates a light L1 to the first side 190S1 of the substrate 190. The substrate 190 can guide an irradiated light L1. The irradiated light L1 is incident on the display panel 100 from the first side 190S1. The first side 190S1 is a light incident surface.

Materials having light transmittance are used for the substrate 101 and the substrate 190. For example, glass substrates are used for the substrate 101 and the substrate 190. A quartz substrate or an organic resin substrate may be used for the substrate 101.

The light L1 irradiated from the lighting device 200, for example, is reflected by a first main surface 101A of the substrate 101 and a first main surface 190A of the substrate 190 and propagates in a direction away from the first side 190S1 (second direction D2). The light L1 propagating inside the substrate 101 and the substrate 190 is scattered by the pixel 103 having scattered liquid crystal molecules. The scattered light is referred to as light L2. In this case, the incidence angle of the scattered light (scattered light L2) is smaller than the critical angle. Each of the light L2 is emitted to the outside from the first main surface 190A of the substrate 190 and the first main surface 101A of the substrate 101. The light L2 emitted to the outside from the first main surface 190A of the substrate 190 and the first main surface 101A of the substrate 101, respectively, is observed by an observer.

A transistor, a capacity element, a resistance element, an insulating layer, and a wiring layer are arranged on the substrate 101. The substrate 101 is arranged to face the substrate 190 and is bonded to the substrate 190 using a seal 194. The liquid crystal device 130 is provided between the substrate 101 and the substrate 190. In this embodiment, the substrate 101 may be referred to as an array substrate, and the substrate 190 may be referred to as a counter substrate.

FIG. 3 is a functional block diagram of the display system 10. The control device 300 includes a signal source 310, a display control unit 320, a storage unit 330, a light emission control unit 340, and a display drive control unit 350.

The signal source 310 transmits an image signal to the display control unit 320. The image signal includes image data.

The display control unit 320 is composed of various logic circuits. The display control unit 320 receives the image signal from the signal source 310 based on a program stored in the storage unit 330 and performs control for displaying an image corresponding to the image data included in the image signal on the display panel 100. The display control unit 320 can start the display control process when receiving the entered information. In this embodiment, the image may be referred to as information. The image signal includes the uncorrected image data.

The light emission control unit 340 functions as a switch for driving the light-emitting element 220 based on an instruction from the display control unit 320. A method for driving the light-emitting element 220 will be described later.

The display drive control unit 350 transmits a display control signal to the drive circuit 105 and the drive circuit 106 based on the instruction from the display control unit 320.

As shown in FIG. 1 or FIG. 3, the display control unit 320 transmits a light source control signal to the light emission control unit 340. The display control unit 320 transmits the display control signal and corrected image signals (corrected image signals ROSIG, GOSIG and BOSIG (FIG. 15)) to the drive circuit 105 and the drive circuit 106 via the display drive control unit 350 and the flexible printed board 108. The corrected image signals include the corrected image data.

The drive circuit 105 receives the display control signal and generates a scan signal using the display control signal. The scan signal is transmitted to the pixel 103 in the display area 102 via the scan line 145c. The drive circuit 106 receives the display control signal and the corrected image signals. The drive circuit 106 transmits the corrected image signals to the signal line 147b using the display control signal. The corrected image signals are transmitted to the pixel 103 in the display area 102 via the signal line 147b. As a result, the display panel 100 can display a still image and a moving image on the display area 102.

The light-emitting element 220 includes a light-emitting element 220A of a first color (e.g., red), a light-emitting element 220B of a second color (e.g., green), and a light-emitting element 220C of a third color (e.g., blue). The light emission control unit 340 receives the light source control signal and controls a switch in the light emission control unit 340 using the light source control signal to drive the light-emitting element 220. Specifically, the light emission control unit 340 uses the light source control signal to control the switch in the light emission control unit 340 so that the light-emitting element 220A of the first color, the light-emitting element 220B of the second color, and the light-emitting element 220C of the third color emit light in time division. As a result, the display control unit 320 can drive the light-emitting element 220A of the first color, the light-emitting element 220B of the second color, and the light-emitting element 220C of the third color in a field sequential method.

1-2. Correction

Figure 4A:
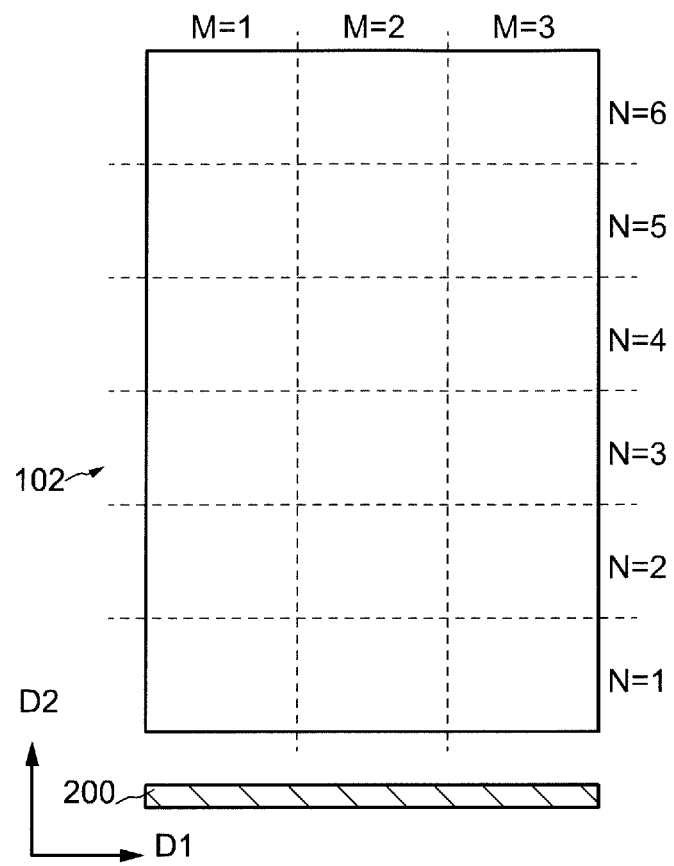
FIG. 4A is a diagram showing an image corresponding to uncorrected image data transmitted by a signal source according to an embodiment of the present invention.

In the following description, configurations and functions of a correction example 1, a correction example 2, and a correction example 3 are described. In the description of the correction example 1, the correction example 2, and the correction example 3, for example, as shown in FIG. 4A, the display area 102 is divided into three areas (M=1 to 3) in the first direction D1 and divided into six areas (N=1 to 6) in the second direction D2. As a result, the display system 10 corrects images included in each area divided into 18 blocks. Each area includes the plurality of pixels 103. When each area is described, for example, an area of M=2 and N=4 is described by an area (2, 4). The number of divisions of the display area 102 shown here is an example, and the number of divisions of the display area 102 is not limited to the example shown here.

1-2-1. Correction Example 1

Figure 4B:
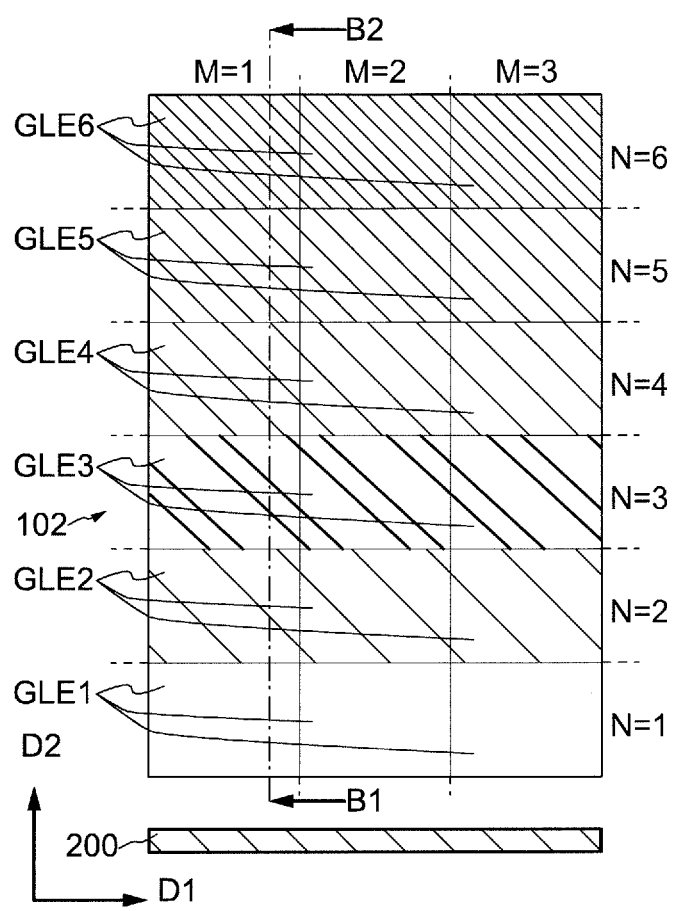
FIG. 4B is a diagram showing an uncorrected image displayed by a display panel according to an embodiment of the present invention.
Figure 4C:
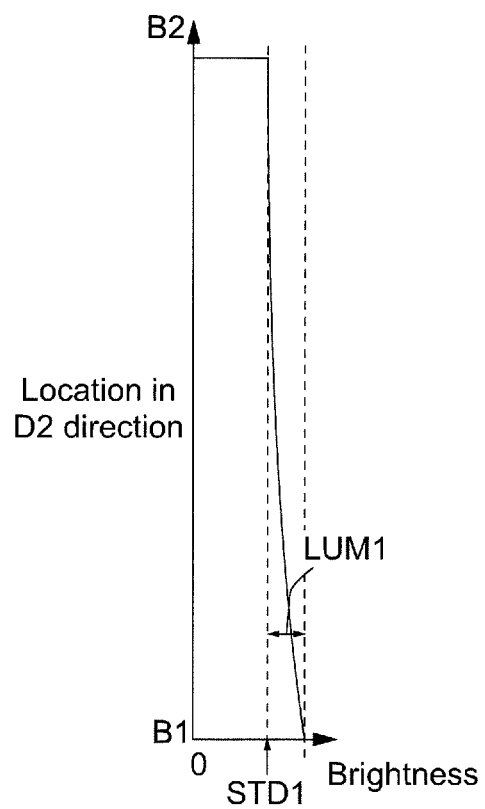
FIG. 4C is a diagram showing the brightness distribution at a location along a line B1-B2 of the uncorrected image.
Figure 5A:
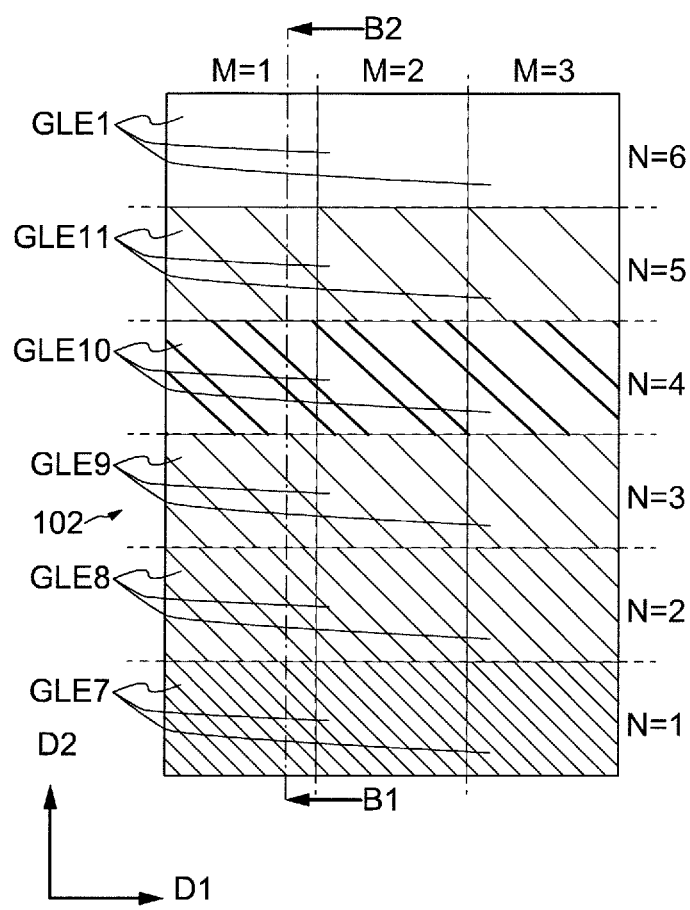
FIG. 5A is a diagram showing image data based on a correction coefficient for the uncorrected image shown in FIG. 4B.
Figure 5B:
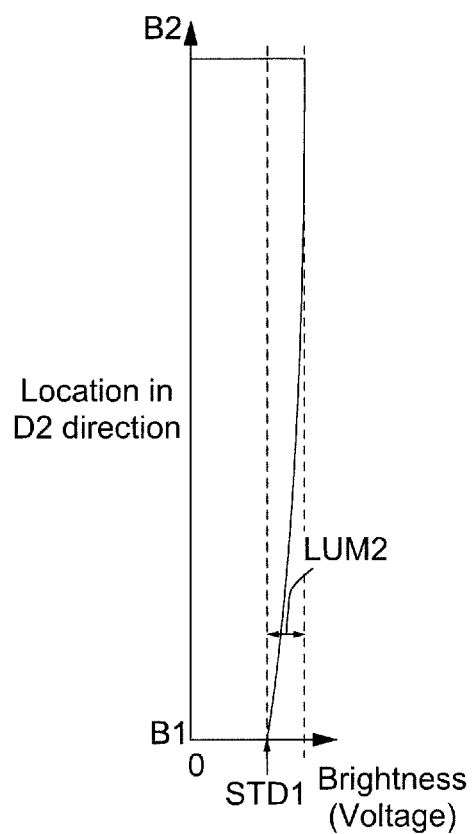
FIG. 5B is a diagram showing a voltage distribution at the location along the line B1-B2 of the image data based on the correction coefficient shown in FIG. 5A.
Figure 5C:
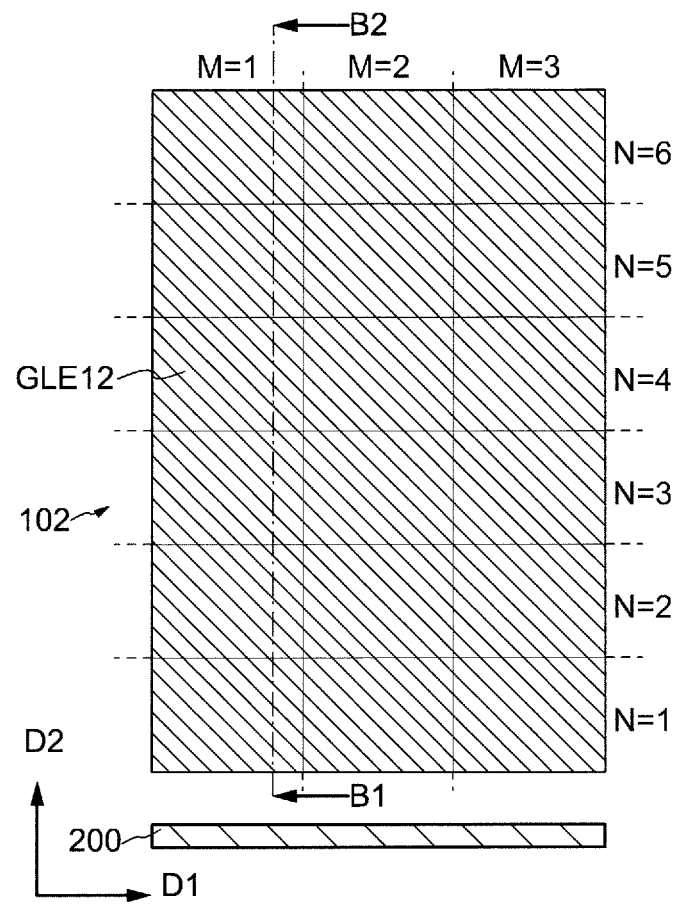
FIG. 5C is a diagram showing a corrected image displayed by a display panel according to an embodiment of the present invention.
Figure 5D:
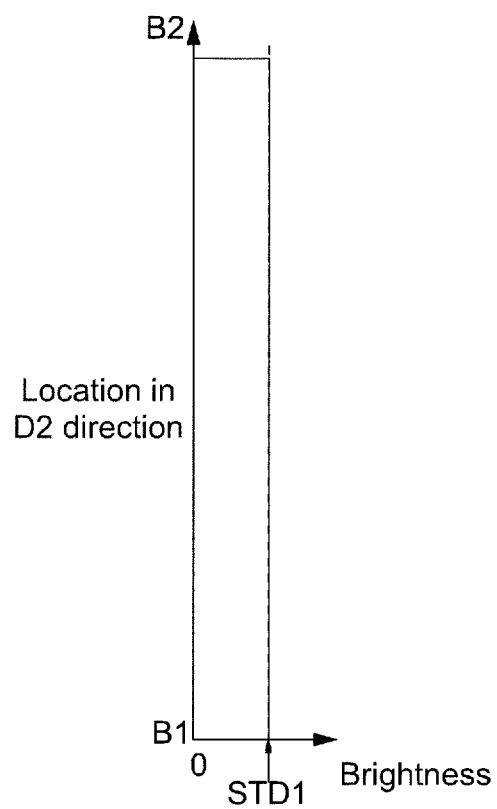
FIG. 5D is a diagram showing the brightness distribution at the location along the line B1-B2 of the corrected image shown in FIG. 5C.

In the correction example 1, a configuration and a function of the display panel 100 when the display panel 100 displays a white image (all-white image) is described. FIG. 4A is a diagram showing an image corresponding to the uncorrected image data transmitted by the signal source 310 according to the present embodiment, FIG. 4B is an uncorrected image displayed by the display panel 100 according to the present embodiment, and FIG. 4C is a diagram showing a brightness distribution at a location along a line B1-B2 of the uncorrected image. FIG. 5A is image data based on a correction coefficient for the uncorrected image shown in FIG. 4B, FIG. 5B is a diagram showing a voltage distribution at a location along a line B1-B2 of the image data based on the correction coefficient shown in FIG. 5A, FIG. 5C is a diagram showing a corrected image displayed by the display panel 100 according to the present embodiment, and FIG. 5D is a diagram showing a brightness distribution at a location along the line B1-B2 of the corrected image shown in FIG. 5C. The configuration and function of the display panel 100 according to the correction example 1 are not limited to the configuration shown in FIG. 4 to FIG. 5. Descriptions of the same or similar components as those of FIG. 1 to FIG. 3 may be omitted.

As shown in FIG. 4A, ideally, the display panel 100 displays an image on the display area 102 with no display unevenness corresponding to all-white image data. On the other hand, as shown in FIG. 4B, the brightness of the uncorrected image displayed by the display panel 100 is lower as the brightness of the image displayed on the area is farther from the lighting device 200, and the image displayed on the display panel 100 becomes darker. That is, in the display area 102, the brightness gradually decreases in the order of brightness GLE1, brightness GLE2, brightness GLE3, brightness GLE4, brightness GLE5, and brightness GLE6 from an area (M, 1) to an area (M, 6). This display is referred to as a brightness gradient in the present embodiment. Since the scattering of light in the area farther from the lighting device 200 is less than the scattering of light in the area light closer to the lighting device 200, the brightness decreases from the area (M, 1) to the area (M, 6) in the display area 102.

For example, as shown in FIG. 4C, the brightness at the location along the line B1-B2 of the uncorrected image decreases from B1 closer to the lighting device 200 toward B2 farther from the lighting device 200. In practice, each area includes the plurality of pixels 103, and the image displayed on the display panel 100 gradually darkens from the side closer to the lighting device 200 toward the side farther from the lighting device 200 for each area. In FIG. 4C, for example, when the brightness of the display area 102 farthest from the lighting device 200 is the brightness STD1, the brightness of the display area 102 nearest to the lighting device 200 is the highest. The brightness at that time is the brightness STD1+brightness LUM1.

Next, as shown in FIG. 5A, the display system 10 generates a correction coefficient for the uncorrected image. The correction coefficient is a coefficient such that the brightness of the image displayed on the display area farther from the lighting device 200 is brighter. That is, the correction coefficient is a coefficient based on the brightness such that the display area 102 gradually becomes brighter in the order of brightness GLE7, brightness GLE8, brightness GLE9, brightness GLE10, brightness GLE11, and the brightness GLE1 from the area (M, 1) to the area (M, 6).

For example, as shown in FIG. 5B, the voltage distribution at the location along the line B1-B2 of the image data based on the correction coefficient corresponding to the all-white image increases from B1 closer to the lighting device 200 toward B2 farther from the lighting device 200. That is, the brightness distribution at the location along the line B1-B2 of the image corresponding to the image data based on the correction coefficient corresponding to the all-white image becomes brighter from B1 closer to the lighting device 200 toward B2 farther from the lighting device 200. When the brightness of the display area 102 nearest to the lighting device 200 is the brightness STD1, the brightness of the display area 102 farthest from the lighting device 200 is the highest. The brightness at that time is the brightness STD1+brightness LUM2.

The display system 10 generates image data based on the correction coefficient based on the image data corresponding to the all-white uncorrected image. The image data based on the correction coefficient is the image data that makes the brightness of the corrected image uniform. As shown in FIG. 5C, for example, the display system 10 generates image data based on a correction coefficient that makes the brightness of the image displayed on the display area 102 a uniform brightness GLE12 from the side closer to the lighting device 200 to the side farther from the lighting device 200. Thereafter, the display system 10 displays the corrected image corresponding to the corrected image data on the display area 102 of the display panel 100. In the present embodiment, the image data based on the correction coefficient may be referred to as corrected image data.

For example, as shown in FIG. 5D, the brightness at the location along the line B1-B2 of the corrected image is the uniform brightness STD1 from B1 closer to the lighting device 200 to B2 farther from the lighting device 200.

As described above, the display system 10 according to the correction example 1 generates the image data based on the correction coefficient for the uncorrected image data with high brightness by using the image data based on the correction coefficient that makes the brightness lower. The display system 10 according to the correction example 1 generates the image data based on the correction coefficient for the uncorrected image data with low brightness by using the image data based on the correction coefficient that makes the brightness higher. Consequently, the display system 10 according to the correction example 1 can correct the display unevenness (brightness gradient) before correction and display an image that exhibits brightness with suppressed display unevenness on the display panel 100.

1-2-2. Correction Example 2

Figure 6A:
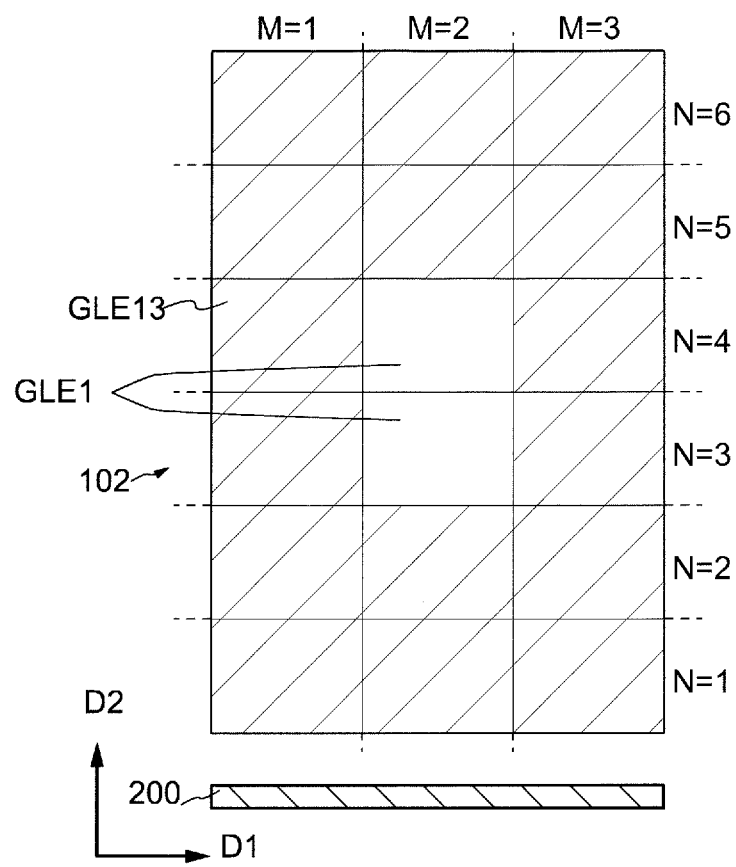
FIG. 6A is a diagram showing an image corresponding to the uncorrected image data transmitted by the signal source according to an embodiment of the present invention.
Figure 6B:
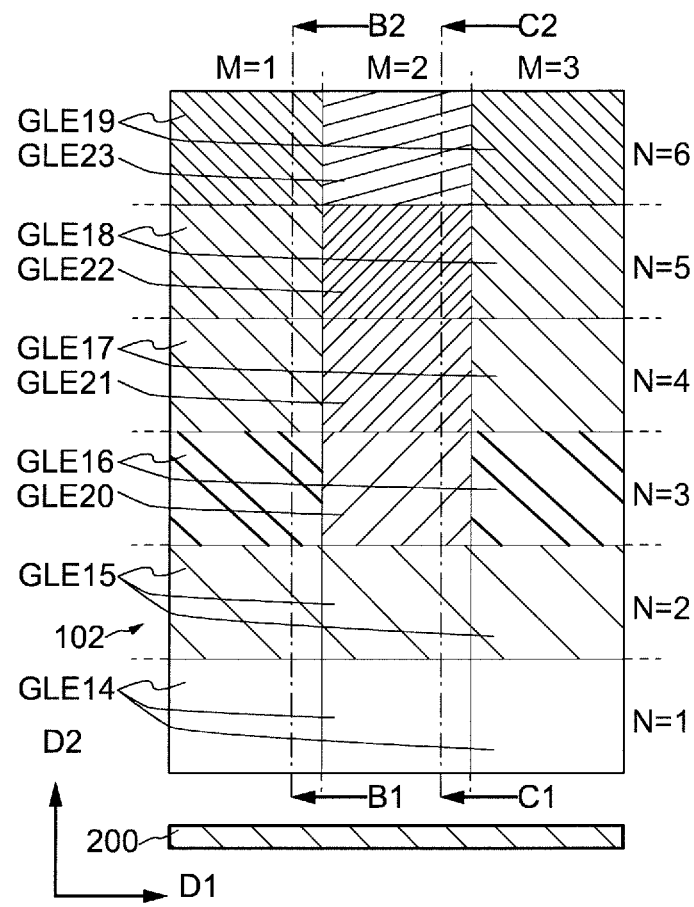
FIG. 6B is a diagram showing the uncorrected image displayed by a display panel according to an embodiment of the present invention.
Figure 6C:
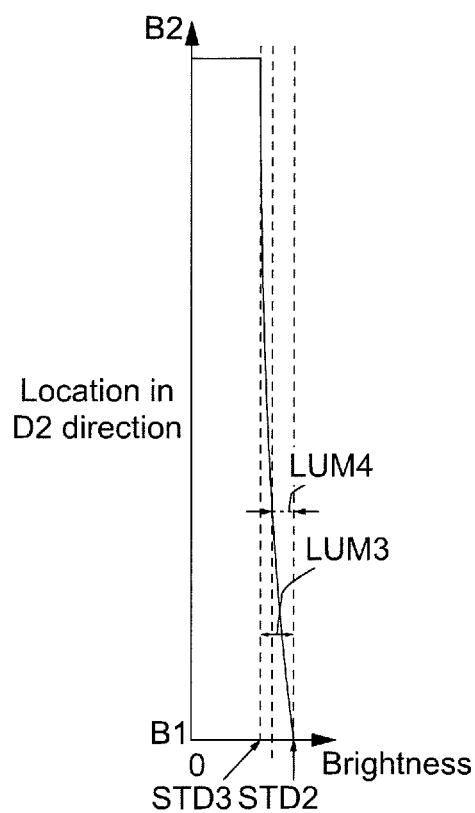
FIG. 6C is a diagram showing the brightness distribution along the line B1-B2 of the uncorrected image shown in FIG. 6B.
Figure 6D:
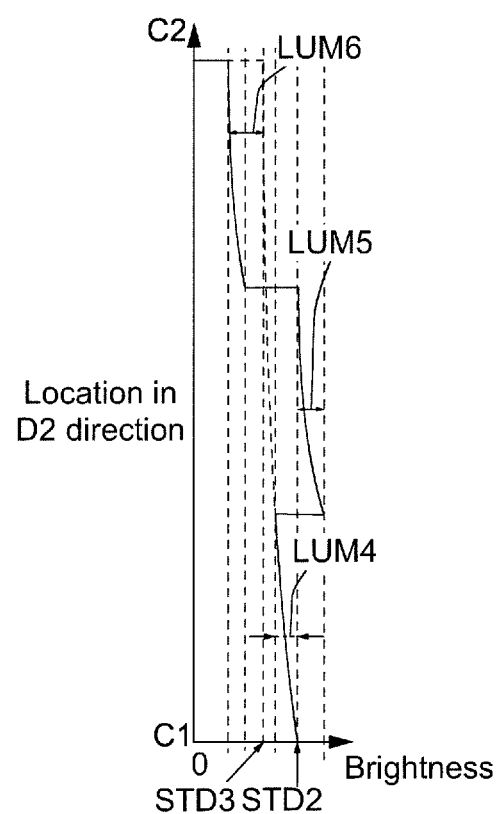
FIG. 6D is a diagram showing the brightness distribution along a line C1-C2 of the uncorrected image shown in FIG. 6B.
Figure 7A:
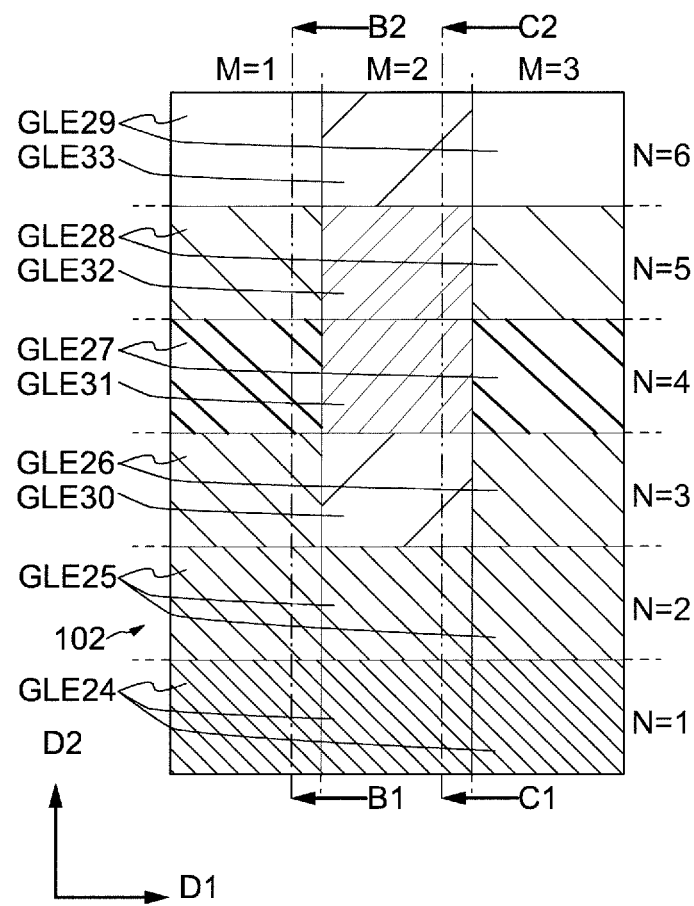
FIG. 7A is a diagram showing image data based on a correction coefficient for the uncorrected image shown in FIG. 6B.
Figure 7B:
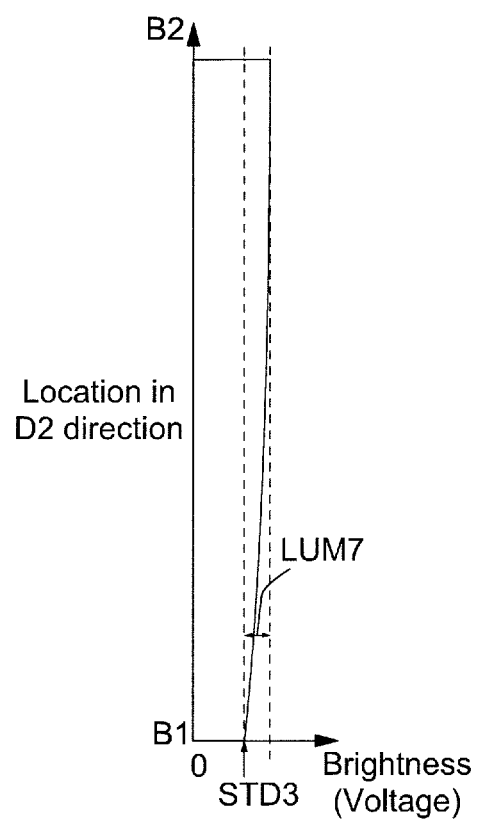
FIG. 7B is a diagram showing a voltage distribution at the location along the line B1-B2 of the image data based on the correction coefficient shown in FIG. 7A.
Figure 7C:
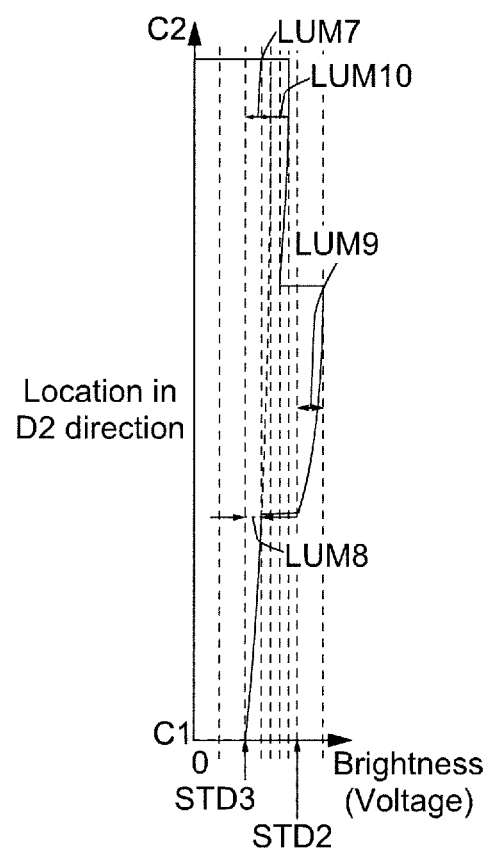
FIG. 7C is a diagram showing a voltage distribution at a location along the line C1-C2 of the image data based on the correction coefficient shown in FIG. 7B.
Figure 7D:
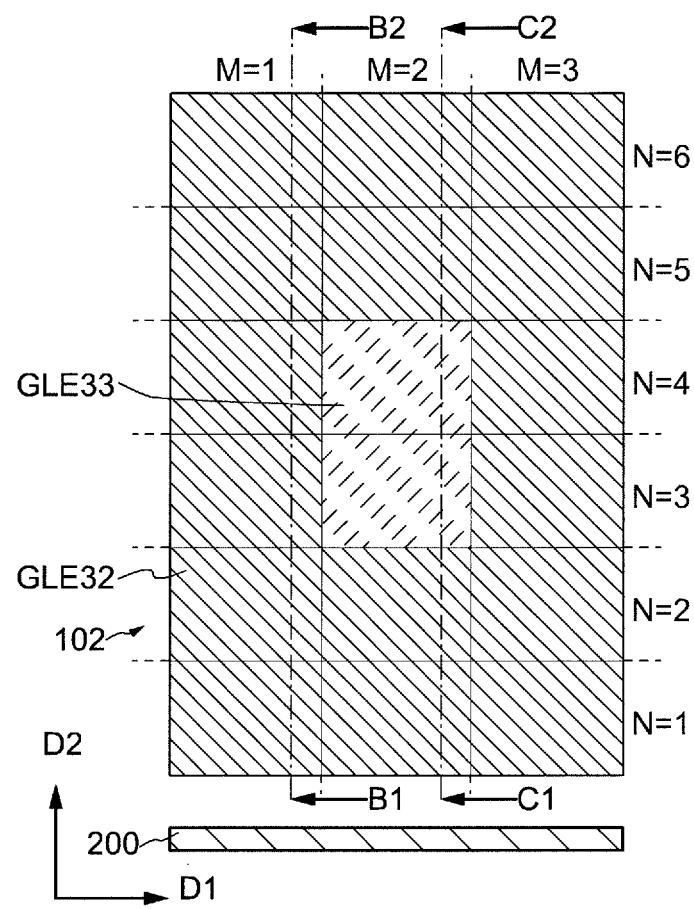
FIG. 7D is a diagram showing a corrected image displayed by a display panel according to an embodiment of the present invention.
Figure 7E:
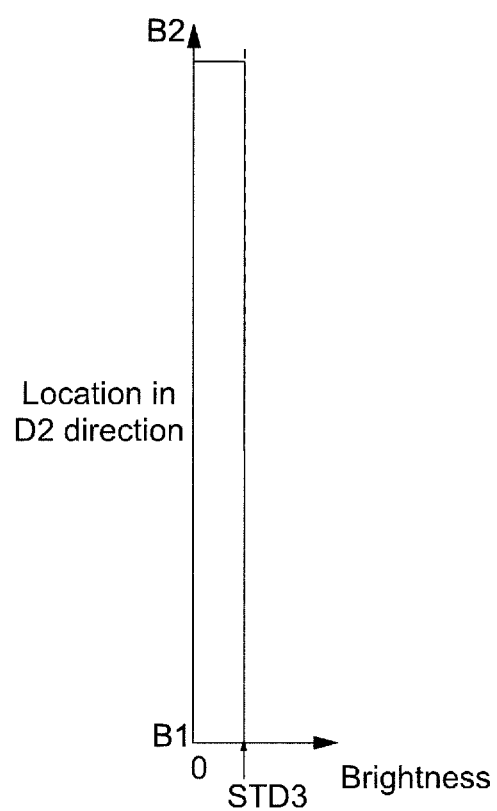
FIG. 7E is a diagram showing the brightness distribution along the line B1-B2 of the corrected image shown in FIG. 7D.
Figure 7F:
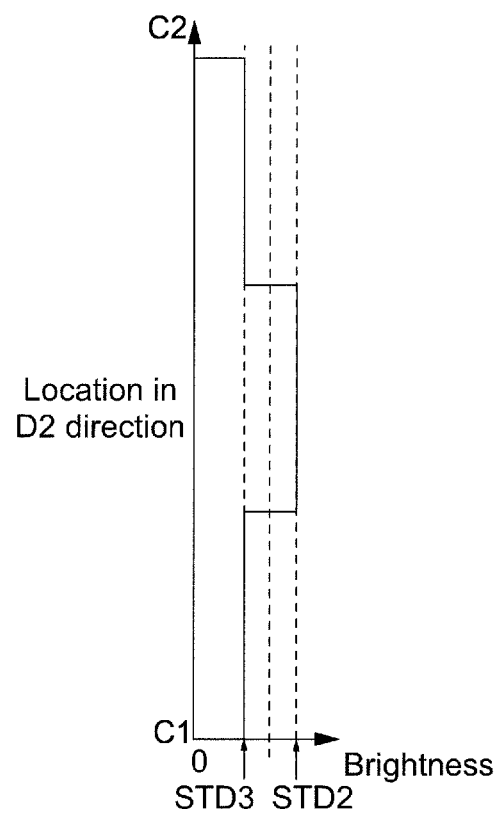
FIG. 7F is a diagram showing the brightness distribution along the line C1-C2 of the corrected image shown in FIG. 7D.

In the correction example 2, a configuration and a function of the display panel 100 when the display panel 100 displays a white image (white window) inside a halftone image will be described. FIG. 6A is a diagram showing an image corresponding to the uncorrected image data transmitted by the signal source 310 according to the embodiment, FIG. 6B is an uncorrected image displayed by the display panel 100 according to the present embodiment, FIG. 6C is a diagram showing a brightness distribution at the location along the line B1-B2 of the uncorrected image shown in FIG. 6B, and FIG. 6D is a diagram showing a brightness distribution at a location along a line C1-C2 of the uncorrected image shown in FIG. 6B. FIG. 7A is image data based on the correction coefficient for the uncorrected image shown in FIG. 6B, FIG. 7B is a diagram showing a voltage distribution at the location along the line B1-B2 of the image data based on the correction coefficient shown in FIG. 7A, FIG. 7C is a diagram showing a voltage distribution at the location along the line C1-C2 of the image data based on the correction coefficient shown in FIG. 7A. FIG. 7D is a diagram showing a corrected image displayed by the display panel 100 according to an embodiment of the present invention, FIG. 7E is a diagram showing a voltage distribution at the location along the line B1-B2 of the image data based on the correction coefficient shown in FIG. 7D, and FIG. 7F is a diagram showing a voltage distribution at the location along the line C1-C2 of the image data based on the correction coefficient shown in FIG. 7D. The configuration and function of the display panel 100 according to the correction example 2 are not limited to the configurations shown in FIG. 6A to FIG. 7F. Description of the same or similar components as those of FIG. 1 to FIG. 5D may be omitted.

In the present embodiment, the halftone image is an image that exhibits an intermediate color or an approximately intermediate color between black and white.

As shown in FIG. 6A, ideally, the display panel 100 displays an image on the display area 102 with no display unevenness corresponding to the white window image data. Each area (M, 1) to an area (M, 2), an area (1, 3), an area (1, 4), an area (3, 3), an area (3, 4), and an area (M, 5) to the area (M, 6) is an area on which a halftone image is displayed. Each area (2, 3) and the area (2, 4) is an area on which a white image is displayed.

On the other hand, as shown in FIG. 6B, the brightness of the uncorrected white window image displayed by the display panel 100 becomes lower the further the display area is from the lighting device 200. That is, in the area where a halftone image is displayed, the brightness gradually decreases from brightness GLE14 to brightness GLE15 from the area (M, 1) to the area (M, 2). Similar to the area (M, 1) to the area (M, 2), the brightness gradually decreases from brightness GLE16 to brightness GLE17 from the area (1, 3) to the area (1, 4), and the area (3, 3) to the area (3, 4), and the brightness gradually decreases from brightness GLE18 to brightness GLE19 from an area (1, 5) to an area (1, 6), and an area (3, 5) to an area (3, 6).

As shown in FIG. 6B, in the area displaying a white image, the brightness gradually decreases from brightness GLE20 to brightness GLE21 from the area (2, 3) to the area (2, 4). Relative to the area displaying a white image, the brightness of an area (2, 5) and an area (2, 6) for displaying a halftone image located on the opposite side of the lighting device 200 is lower than the brightness of each area (M, 1) to the area (M, 2), the area (1, 3), the area (1, 4), the area (3, 3), the area (3, 4), the area (1, 5), the area (1, 6), the area (3, 5) and the area (3, 6) displaying the halftone image. That is, brightness GLE22 and brightness GLE23 are lower than the brightness GLE14, the brightness GLE15, the brightness GLE16, the brightness GLE17, the brightness GLE18, the brightness GLE19, the brightness GLE20, and the brightness GLE21.

In the area displaying a white image, the scattering of light in the area farther from the lighting device 200 is less than the scattering of light in the area closer to the lighting device 200. As a result, the brightness decreases from the area (2, 3) to the area (2, 4) for displaying a white image, and the brightness further decreases from the area (2, 5) to the area (2, 6) for displaying the halftone image. The brightness of the area (2, 5) and the area (2, 6) displaying a halftone image in the area farther from the lighting device 200 for the area (2, 4) displaying a white image is lower than each brightness of the area (1, 5), the area (1, 6), the area (3,5), and the area (3, 6) displaying a halftone image in the area farther from the lighting device 200 for the area (1, 4) and the area (3, 4) displaying a halftone image. As a result, crosstalk occurs in the area (2, 5) and the area (2, 6) displaying a halftone image.

As shown in FIG. 6C, in the brightness distribution at the location along the line B1-B2 of the uncorrected image, the brightness decreases from B1 closer to the lighting device 200 toward B2 farther from the lighting device 200. In practice, each area includes the plurality of pixels 103, and the image displayed on the display panel 100 gradually decreases from the side closer to the lighting device 200 toward the side farther from the lighting device 200 for each area. In FIG. 6C, for example, when the brightness of the display area 102 nearest to the lighting device 200 is brightness STD2, the brightness of the display area 102 farthest from the lighting device 200 is the lowest. The brightness at that time is, for example, the brightness STD2−brightness LUM3=brightness STD3.

As shown in FIG. 6D, in the brightness distribution at the location along the line C1-C2 of the uncorrected image, the brightness decreases from C1 closer to the lighting device 200 toward the area (M, 1) and the area (M, 2) for displaying a halftone image. The brightness of the display area 102 closest to the lighting device 200 is the brightness STD2. In the area (2, 2), the brightness on the side farther from the lighting device 200 is the brightness STD2−brightness LUM4. The brightness decreases from the area (2, 3) to the area (2, 4) for displaying a white image. In the area (2, 3), the brightness on the side closer to the lighting device 200 is the brightness STD2+brightness LUM5. In the area (2, 4), the brightness on the side farther from the lighting device 200 is, for example, the brightness between the brightness STD2 and the brightness STD3. Further, the brightness decreases from the area (2, 5) to the area (2, 6) for displaying a halftone image. In the area (2, 5), the brightness on the side closer to the lighting device 200 is the brightness between the brightness STD2+the brightness LUM5 and the brightness STD2. In the area (2, 6), the brightness on the side farther from the lighting device 200 is the brightness STD3−brightness LUM6.

Next, as shown in FIG. 7A, the display system 10 generates a correction coefficient for the uncorrected image. The correction coefficient is a coefficient that makes the brightness of the image displayed on the display area farther from the lighting device 200 brighter. In the area for displaying a halftone image, the correction coefficient is a coefficient based on the brightness such that it gradually becomes brighter from the brightness GLE24 to the brightness GLE25 from the area (M, 1) to the area (M, 2). Similar to the area (M, 1) to the area (M, 2), the correction coefficient is a coefficient based on the brightness such that it gradually becomes brighter from brightness GLE26 to brightness GLE27 from the area (1, 3) to the area (1, 4) and the area (3, 3) to the area (3, 4), the correction coefficient is a coefficient based on the brightness such that it gradually becomes brighter from brightness GLE28 to the brightness GLE29 from the area (1, 5) to the area (1, 6) and the area (3, 5) to the area (3, 6), and the correction coefficient is a coefficient based on the brightness such that it gradually becomes brighter from brightness GLE32 to the brightness GLE33 from the area (2, 5) to the area (2, 6). In the area for displaying a white image, the correction coefficient is a coefficient based on the brightness such that it gradually becomes brighter from brightness GLE30 to brightness GLE31 from the area (2, 3) to the area (2, 4).

As shown in FIG. 7B, the voltage at the location along the line B1-B2 of the image data based on the correction coefficient corresponding to the white window image increases from B1 closer to the lighting device 200 toward B2 farther from the lighting device 200. That is, the brightness at the location along the line B1-B2 of the image data based on the correction coefficient corresponding to the white window image becomes higher from B1 closer to the lighting device 200 toward B2 farther from the lighting device 200, and the display of the image becomes brighter. When the brightness of the display area 102 closest to the lighting device 200 is the brightness STD3, the brightness of the display area 102 farthest from the lighting device 200 is the highest. The brightness at that time is, for example, the brightness STD3+brightness LUM7.

As shown in FIG. 7C, the voltage at the location along the line C1-C2 of the image data based on the correction coefficient corresponding to the white window image increases from C1 closer to the lighting device 200 toward an area (2, 1) and the area (2, 2) for displaying a halftone image. When the brightness of the display area 102 closest to the lighting device 200 is the brightness STD3, the brightness on the side farther from the lighting device 200 in the area (2, 2) is the brightness STD3+brightness LUM8. The voltage corresponding to each image increases from the area (2, 3) to the area (2, 4) for displaying a white image. In the area (2, 3), the brightness on the side closer to the lighting device 200 is the brightness STD2, and in the area (2, 4), the brightness on the side farther from the lighting device 200 is the brightness STD2+brightness LUM9. In addition, the voltage corresponding to each image increases from the area (2,5) to the area (2,6) for displaying a halftone image. In the area (2, 5), the brightness on the side closer to the lighting device 200 is the brightness between the brightness STD3+the brightness LUM7 and the brightness STD2. In the area (2, 6), the brightness on the side farther from the lighting device 200 is higher than the brightness STD3+the brightness LUM7. The brightness at that time is, for example, the brightness STD3+the brightness LUM7+brightness LUM10.

The display system 10 generates image data based on the correction coefficient based on the image data corresponding to the uncorrected white window image. The image data based on the correction coefficient is the image data that makes the brightness of the corrected image uniform. As shown in FIG. 7D, for example, the display system 10 generates image data based on a correction coefficient that makes the brightness of the image displayed on each area of the area (M, 1) to the area (M, 2), the area (1, 3), the area (1, 4), the area (3, 3), the area (3, 4), and the area (M, 5) to the area (M, 6), which were displaying the halftone before correction, uniform. The display system 10 generates image data based on the correction coefficient such that the brightness of the image displayed on each of the area (2, 3) and the area (2, 4), which were displaying the white image before correction, becomes the uniform brightness GLE33. The display system 10 displays the corrected image corresponding to the corrected image data on the display area 102 of the display panel 100 using the image data based on the generated correction coefficient.

As shown in FIG. 7E, the brightness at the location along the line B1-B2 of the corrected white window image is the uniform brightness STD3 from B1 closer to the lighting device 200 toward B2 farther from the lighting device 200. As shown in FIG. 7F, in the brightness distribution at the location along the line C1-C2 of the corrected white window image, the brightness of the area (2, 1) and the area (2, 2) is STD2, the brightness of the area (2, 3) and the area (2, 4) is STD2, and the brightness of the area (2, 5) and the area (2, 6) is STD3.

As described above, for the uncorrected image data with higher brightness than the brightness of an image such as a white window, the display system 10 according to the correction example 2 generates the image data based on the correction coefficient by using the image data based on the correction coefficient that makes the brightness lower. In addition, for the uncorrected image data with lower brightness than the brightness of an image such as a white window, the display system 10 according to the correction example 2 generates the image data based on the correction coefficient by using the image data based on the correction coefficient that makes the brightness higher. Consequently, the display system 10 according to the correction example 2 can correct crosstalk generated due to the display unevenness (brightness gradient) before correction and display an image that exhibits brightness with suppressed display unevenness on the display panel 100.

1-2-3. Correction Example 3

Figure 8A:
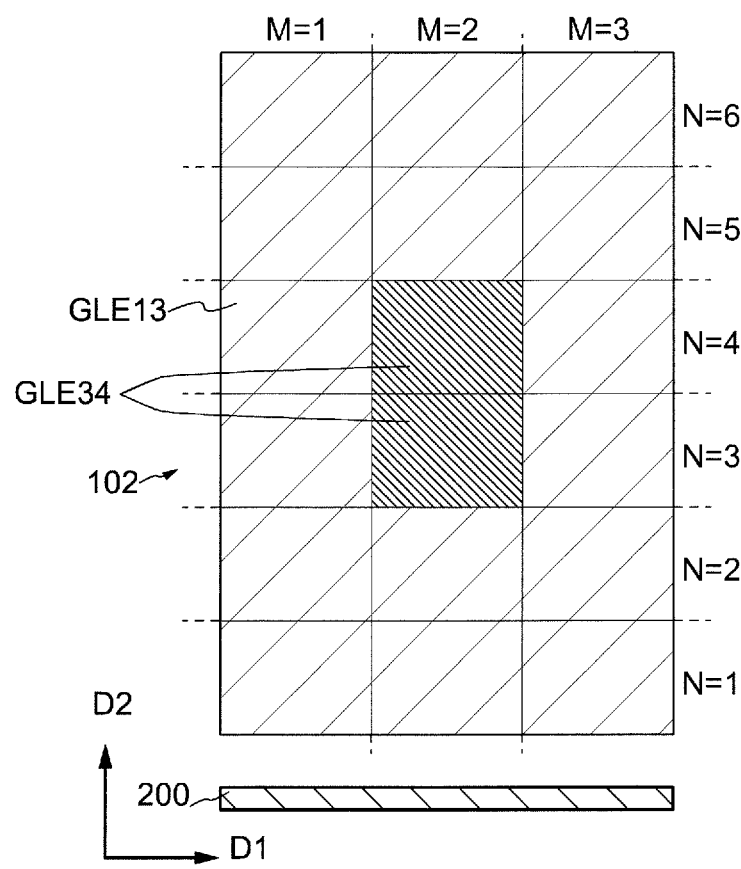
FIG. 8A is a diagram showing an image corresponding to the uncorrected image data transmitted by the signal source according to an embodiment of the present invention.
Figure 8B:
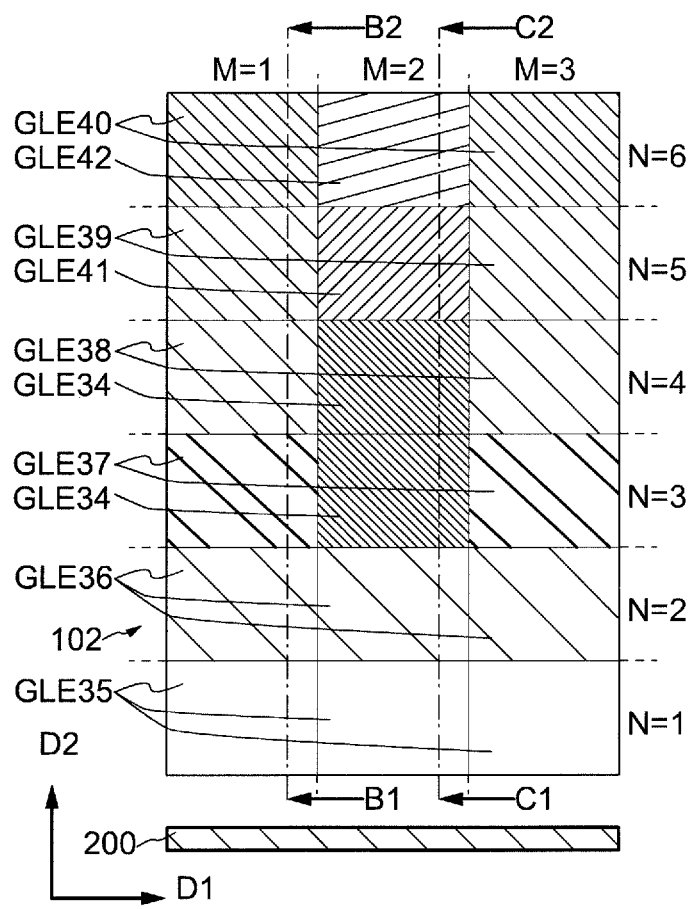
FIG. 8B is a diagram showing the uncorrected image displayed by a display panel according to an embodiment of the present invention.
Figure 8C:
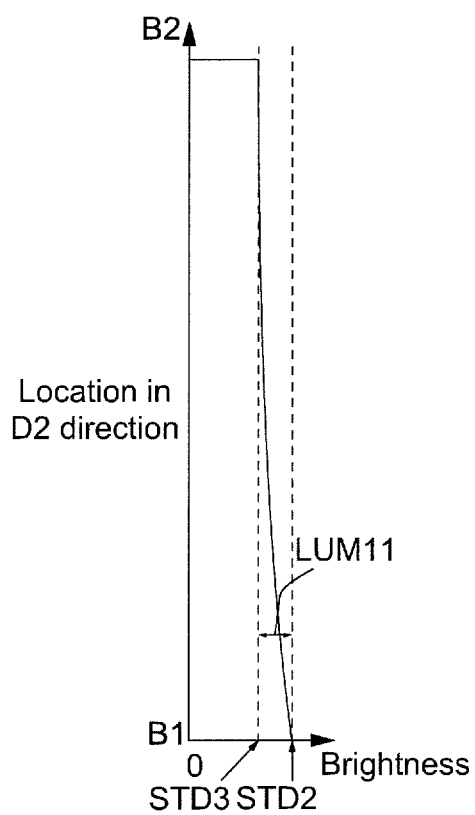
FIG. 8C is a diagram showing the brightness distribution along the line B1-B2 of the uncorrected image shown in FIG. 8B.
Figure 8D:
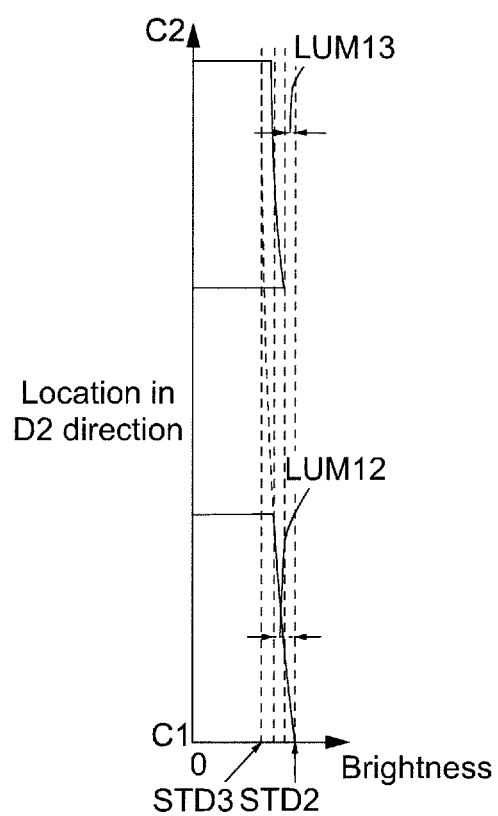
FIG. 8D is a diagram showing the brightness distribution along the line C1-C2 of the uncorrected image shown in FIG. 8B.
Figure 9A:
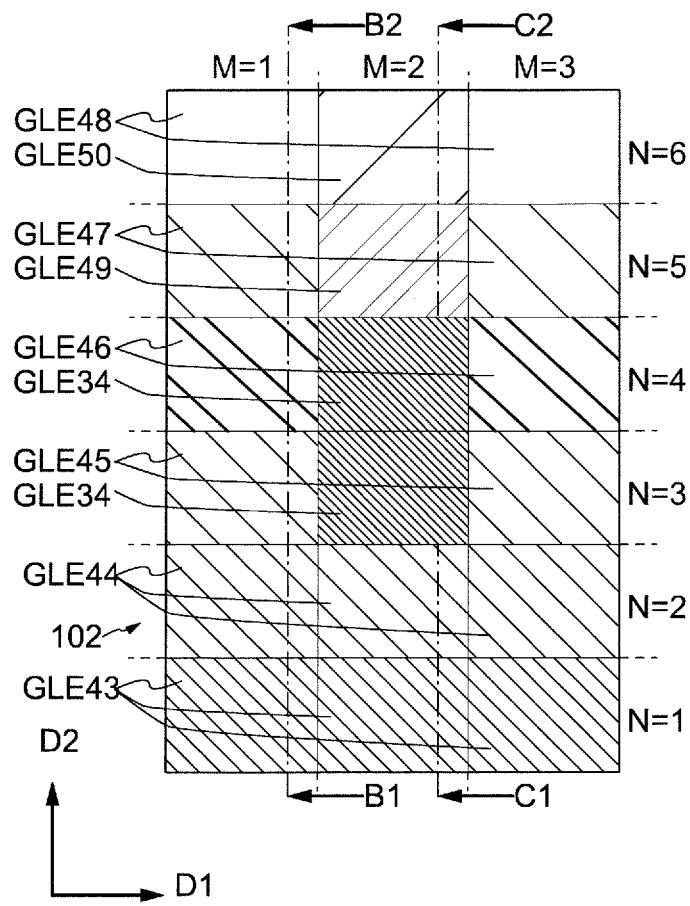
FIG. 9A is a diagram showing image data based on a correction coefficient for the uncorrected image shown in FIG. 8B.
Figure 9B:
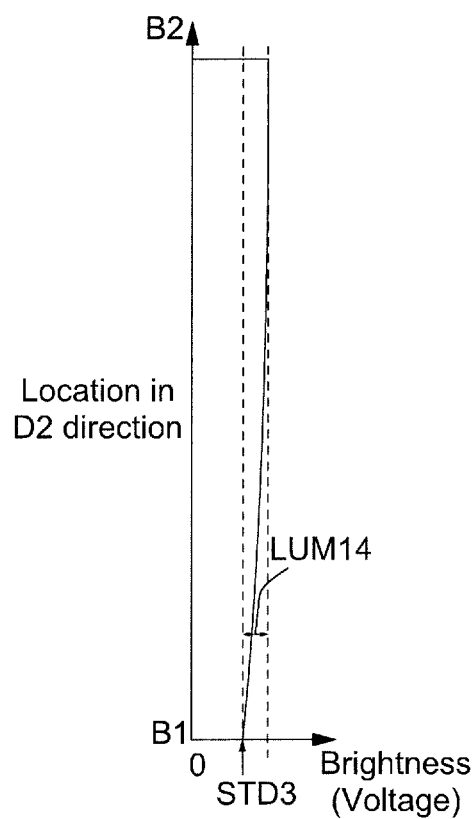
FIG. 9B is a diagram showing a voltage distribution at the location along the line B1-B2 of the image data based on the correction coefficient shown in FIG. 9A.
Figure 9C:
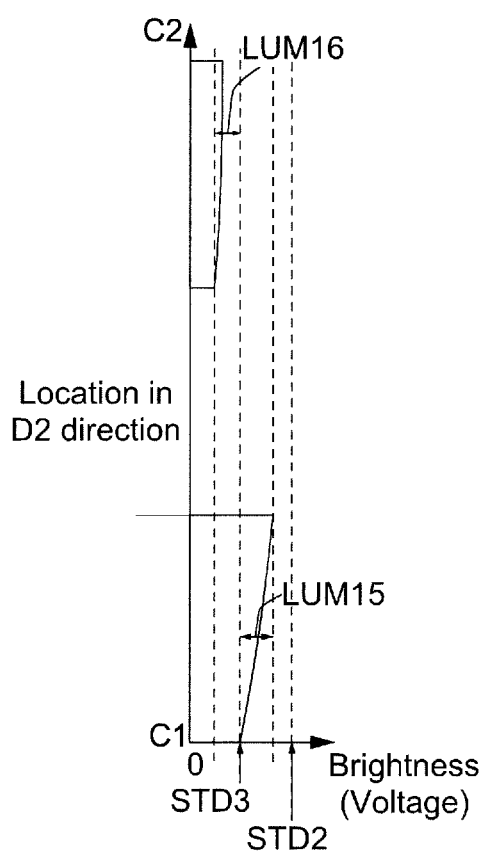
FIG. 9C is a diagram showing a voltage distribution at the location along the line C1-C2 of the image data based on the correction coefficient shown in FIG. 9A.
Figure 9D:
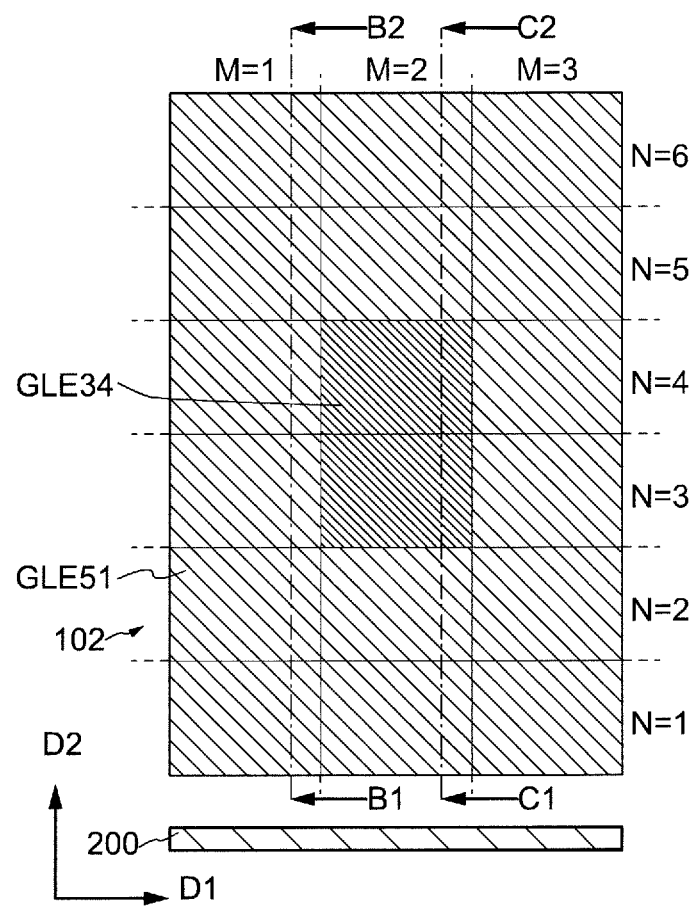
FIG. 9D is a diagram showing a corrected image displayed by a display panel according to an embodiment of the present invention.
Figure 9E:
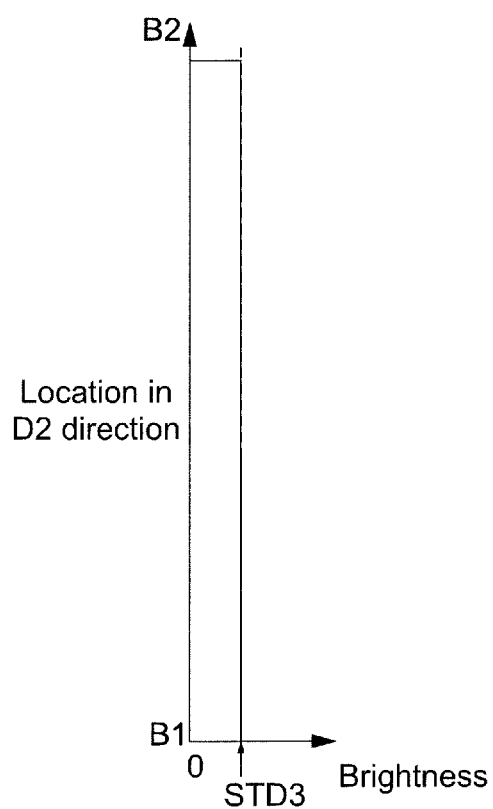
FIG. 9E is a diagram showing the brightness distribution along the line B1-B2 of the corrected image shown in FIG. 9D.
Figure 9F:
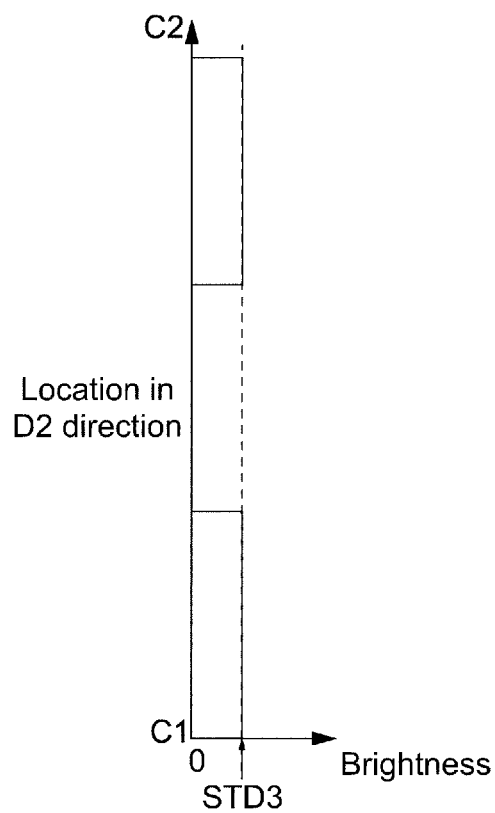
FIG. 9F is a diagram showing the brightness distribution along the line C1-C2 of the corrected image shown in FIG. 9D.

In the correction example 3, a configuration and a function of the display panel 100 when the display panel 100 displays a black image (black window) inside a halftone image will be described. FIG. 8A is a diagram showing an image corresponding to the uncorrected image data transmitted by the signal source 310 according to the present embodiment, FIG. 8B shows the uncorrected image displayed by the display panel 100 according to the present embodiment, FIG. 8C is a diagram showing the brightness distribution at the location along the line B1-B2 of the uncorrected image shown in FIG. 8B, and FIG. 8D is a diagram showing the brightness distribution at the location along the line C1-C2 of the uncorrected image shown in FIG. 8B. FIG. 9A is image data based on the correction coefficient for the uncorrected image shown in FIG. 8B, FIG. 9B is a diagram showing the voltage distribution at the location along the line B1-B2 of the image data based on the correction coefficient shown in FIG. 9A, and FIG. 9C is a diagram showing the voltage distribution at the location along line C1-C2 of the image data based on the correction coefficient shown in FIG. 9A. FIG. 9D is a diagram showing a corrected image displayed by the display panel 100, FIG. 9E shows a brightness distribution at the location along the line B1-B2 of the corrected image shown in FIG. 9D, and FIG. 9F is a diagram showing a brightness distribution at the location along the line C1-C2 of the corrected image shown in FIG. 9D. The configuration and function of the display panel 100 according to the correction example 3 are not limited to the configurations shown in FIG. 8A to FIG. 9F. Description of the same or similar components as those of FIG. 1 to FIG. 7F may be omitted.

As shown in FIG. 8A, ideally, the display panel 100 displays an image on the display area 102 with no display unevenness corresponding to the black window image data. Each area (M, 1) to the area (M, 2), the area (1, 3), the area (1, 4), the area (3, 3), the area (3, 4), and the area (M, 5) to the area (M, 6) is an area on which a halftone image is displayed. The area (2, 3) and the area (2, 4) are areas on which a black image is displayed.

On the other hand, as shown in FIG. 8B, the brightness of the uncorrected black window image displayed by the display panel 100 becomes lower the further the image displayed on the display area is from the lighting device 200, and the brightness of the display panel 100 becomes darker. That is, in the area where a halftone image is displayed, the brightness gradually decreases from brightness GLE35 to brightness GLE36, brightness GLE37 to brightness GLE38, and brightness GLE39 to brightness GLE40 from the area (M, 1) to the area (M, 2), the area (1, 3) to the area (1, 4), the area (3, 3) to the area (3, 4), the area (1, 5) to the area (1, 6), and the area (3, 5) to the area (3, 6).

As shown in FIG. 8B, in the area displaying a black image, the brightness is uniform similar to the brightness GLE34 in the area (2, 3) and the area (2, 4). Relative to the area displaying a black image, the brightness gradually decreases from brightness GLE49 to brightness GLE50 from the area (2, 5) to the area (2, 6) in the area (2, 5) and the area (2, 6) displaying the halftone on the opposite side of the lighting device 200.

Scattering of light does not occur in the area (2, 3) to the area (2, 4) for displaying a black image. The brightness of the area (2, 5) displaying a halftone is higher than that of the area (1, 5) and the area (3, 5). Since the scattering of light occurs in the area (2, 5) for displaying a halftone, the brightness decreases from the area (2, 5) to the area (2, 6) for displaying a halftone. The brightness of the area (2, 5) and the area (2, 6) for displaying a halftone image in the area farther from the lighting device 200 for the area (2, 4) for displaying the black image differs from the brightness of each area of the area (1, 5), the area (1, 6), the area (3, 5) and the area (3, 6) for displaying a halftone image in the area farther from the lighting device 200 for the area (1, 4) and the area (3, 4) displaying the halftone image. As a result, crosstalk occurs in the area (2, 5) and the area (2, 6) for displaying a halftone image.

As shown in FIG. 8C, the brightness at the location along the line B1-B2 of the uncorrected image decreases from B1 closer to the lighting device 200 toward B2 farther from the lighting device 200. In practice, each area includes the plurality of pixels 103, and an image displayed on the display panel 100 gradually decreases from the side closer to the lighting device 200 toward the side farther from the lighting device 200 for each area. In FIG. 8C, for example, when the brightness of the display area 102 farthest from the lighting device 200 is the brightness STD3, the brightness of the display area 102 nearest from the lighting device 200 is the highest. The brightness at that time is, for example, the brightness STD3+brightness LUM11=brightness STD2.

As shown in FIG. 8D, the brightness at the location along the line C1-C2 of the uncorrected image decreases from C1 closer to the lighting device 200 toward the area (M, 1) and the area (M, 2) for displaying the halftone image. When the brightness of the display area 102 closest to the lighting device 200 is the brightness STD2, the brightness of the side farther from the lighting device 200 in the area (2, 2) is the brightness between the brightness STD2 and brightness LUM12. Scattering of light does not occur in the area (2, 3) to the area (2, 4) displaying a black image. Therefore, the brightness of the area (2, 3) to the area (2, 4) for displaying a black image is 0 or near 0. Further, the brightness decreases from the area (2, 5) for displaying a halftone image to the area (2, 6). In the area (2, 5), the brightness on the side closer to the lighting device 200 is the brightness STD2−brightness LUM13. In the area (2, 6), the brightness on the side farther from the lighting device 200 is higher than the brightness STD3 and lower than the brightness STD2−the brightness LUM13. In the area (2, 2), the brightness on the side farther from the lighting device 200 is the brightness between the brightness STD3 and the brightness STD2.

Next, as shown in FIG. 9A, the display system 10 generates a correction coefficient for the uncorrected image. The correction coefficient is a coefficient that makes the brightness of the image displayed on the display area farther from the lighting device 200 brighter. In the area for displaying a halftone image, the correction coefficient is a coefficient based on the brightness such that it gradually becomes brighter from brightness GLE43 to brightness GLE44 from the area (M, 1) to the area (M, 2). Similar to the area (M, 1) to the area (M, 2), the correction coefficient is a coefficient based on the brightness such that it gradually becomes brighter from brightness GLE45 to brightness GLE46 from the area (1, 3) to the area (1, 4) and the area (3, 3) to the area (3, 4), the correction coefficient is a coefficient based on the brightness such that it gradually becomes brighter from brightness GLE47 to brightness GLE48 from the area (1, 5) to the area (1, 6) and the area (3, 5) to the area (3, 6), and the correction coefficient is a coefficient based on the brightness such that it gradually becomes brighter from the brightness GLE49 to the brightness GLE50 from the area (2, 5) to the area (2, 6). The brightness GLE34 of the area (2, 3) to the area (2, 4), which displays a black image, becomes 0 or near 0, and the correction coefficient is a coefficient based on the brightness GLE34.

As shown in FIG. 9B, a voltage at the location along the line B1-B2 of the image data based on the correction coefficient corresponding to the black window image increases from B1 closer to the lighting device 200 toward B2 farther from the lighting device 200. That is, the brightness at the location along the line B1-B2 of the image data based on the correction coefficient corresponding to the black window image increases from B1 closer to the lighting device 200 toward B2 farther from the lighting device 200. When the brightness STD3 of the display area 102 nearest from the lighting device 200 is the brightness STD3, the brightness of the display area 102 farthest from the lighting device 200 is the highest. The brightness at that time is, for example, the brightness STD3+brightness LUM14.

As shown in FIG. 9C, the voltage at the location along the line C1-C2 of the image data based on the correction coefficient corresponding to the black window image increases from C1 closer to the lighting device 200 toward the area (2, 1) and the area (2, 2) for displaying a halftone image. When the brightness of the display area 102 closest to the lighting device 200 is the brightness STD3, the brightness farther from the lighting device 200 in the area (2, 2) is the brightness STD3+brightness LUM15. The brightness of the area (2, 3) to the area (2, 4) for displaying a black image is near 0 or 0, and the voltage corresponding to each image is, for example, near 0 or 0. Further, the voltages corresponding to each image increase from the area (2, 5) to the area (2, 6) for displaying a halftone image. In the area (2, 5), the brightness on the side closer to the lighting device 200 is the brightness STD3−brightness LUM16, and in the area (2, 6), the brightness on the side farther from the lighting device 200 is the brightness between the brightness STD3 and the brightness STD3−the brightness LUM16.

The display system 10 generates image data based on the correction coefficient based on the image data corresponding to the uncorrected black window image. The image data based on the correction coefficient is the image data that makes the brightness of the corrected image uniform. As shown in FIG. 9D, for example, the display system 10 generates image data based on a correction coefficient such that the brightness of the image displayed on each area of the area from the area (M, 1) to the area (M, 2), the area (1, 3), the area (1, 4), the area (3, 3), the area (3, 4), and the area from the area (M, 5) to the area (M, 6) becomes uniform brightness GLE51. The area from the area (M, 1) to the area (M, 2), the area (1, 3), the area (1, 4), the area (3, 3), the area (3, 4), and the area from the area (M, 5) to the area (M, 6) were displaying the halftone before correction. The display system 10 generates image data based on a correction coefficient such that the brightness GLE34 is the same as that of the image displayed on each of the area (2, 3) and the area (2, 4), which were displayed the black image before correction. The display system 10 displays the corrected image corresponding to the corrected image data on the display area 102 of the display panel 100 using the image data based on the generated correction coefficient.

As shown in FIG. 9E, the brightness at the location along the line B1-B2 of the corrected black window image is the uniform brightness STD3 from B1 closer to the lighting device 200 toward B2 farther from the lighting device 200. As shown in FIG. 9F, in the brightness distribution at the location along the line C1-C2 of the image of the corrected black window, the brightness of the area (2, 1) and the area (2, 2) becomes the brightness STD3, the brightness of the area (2, 3) and the area (2, 4) becomes 0 or near 0, and the brightness of the area (2, 5) and the area (2, 6) becomes the brightness STD3.

As described above, for the uncorrected image data with high brightness for an image such as a black window, the display system 10 according to the correction example 3 generates the image data based on the correction coefficient by using the image data based on the correction coefficient that makes the brightness lower. In addition, for the uncorrected image data with low brightness for an image such as a black window, the display system 10 according to the correction example 3 generates the image data based on the correction coefficient by using the image data based on the correction coefficient that makes the brightness higher. Consequently, the display system 10 according to the correction example 3 corrects crosstalk generated due to the display unevenness before correction (brightness gradient) and displays an image that exhibits brightness with suppressed display unevenness on the display panel 100.

The brightness STD1 to the brightness STD3, the brightness LUM1 to the brightness LUM16 shown in the correction example 1, the correction example 2, and the correction example 3 indicate a reference value of the brightness, and the actual brightness does not necessarily match the brightness STD1 to the brightness STD3 and the brightness LUM1 to the brightness LUM16.

1-2-4. Correction Example 4

Figure 10A:
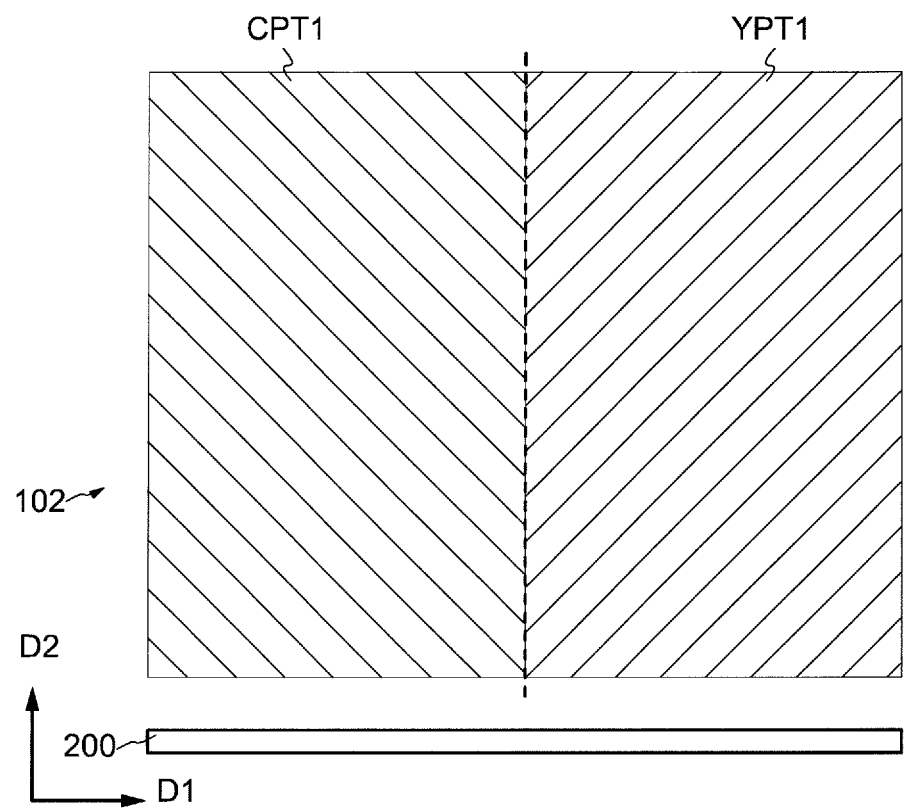
FIG. 10A is a diagram showing an image corresponding to the uncorrected image data transmitted by the signal source according to an embodiment of the present invention.
Figure 10B:
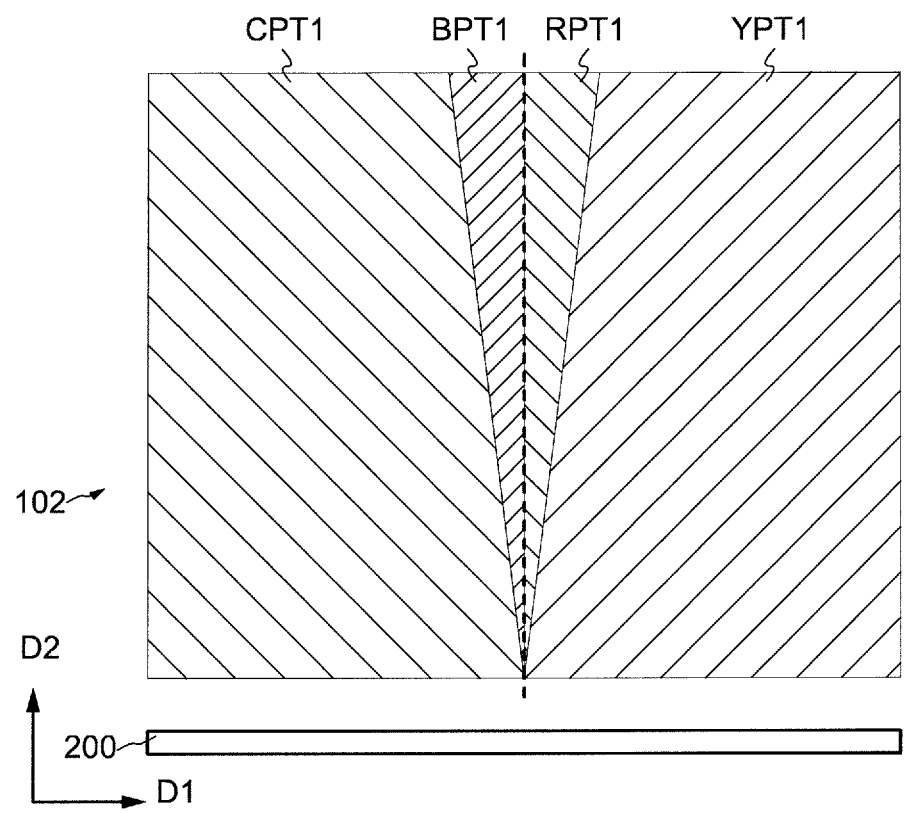
FIG. 10B is a diagram showing the uncorrected image displayed by a display panel according to an embodiment of the present invention.
Figure 11A:
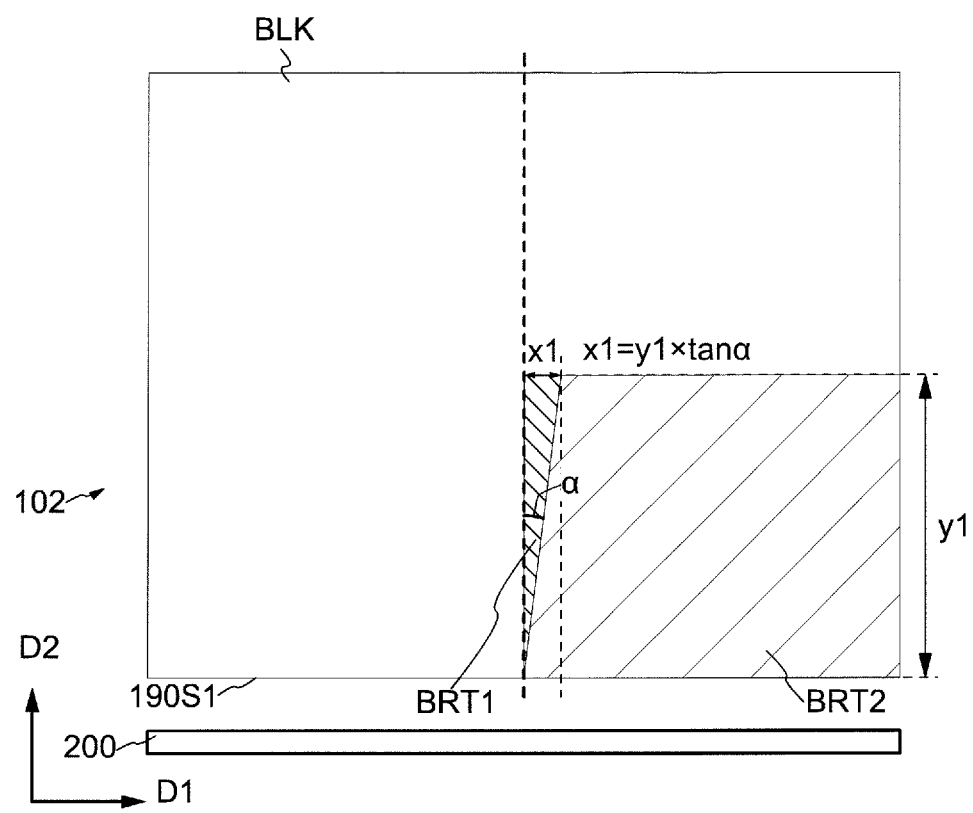
FIG. 11A is a diagram for explaining a method of calculating a correction width according to an embodiment of the present invention.
Figure 11B:
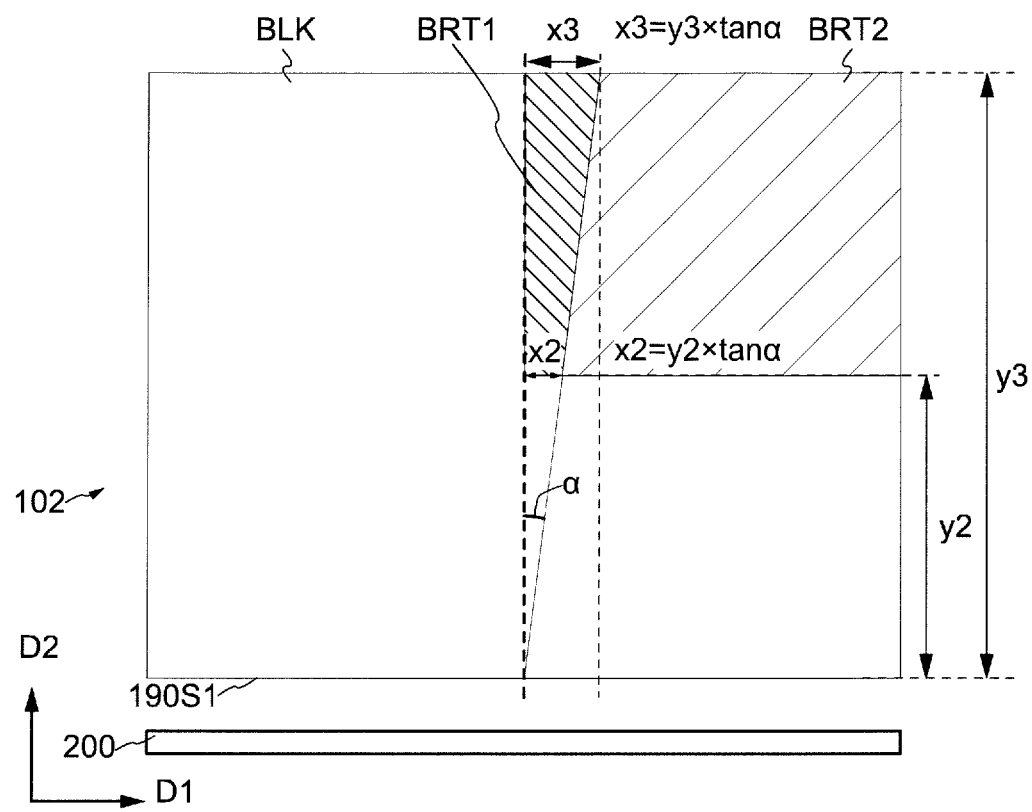
FIG. 11B is a diagram for explaining a method of calculating a correction width according to an embodiment of the present invention.
Figure 12A:
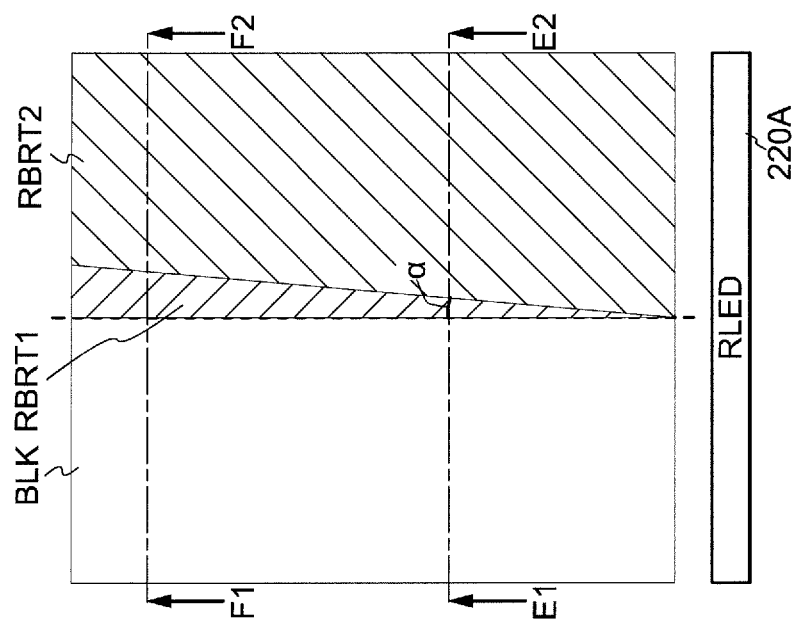
FIG. 12A is a diagram showing an uncorrected image corresponding to a light-emitting element of a first color among the uncorrected image data shown in FIG. 10B.
Figure 12B:
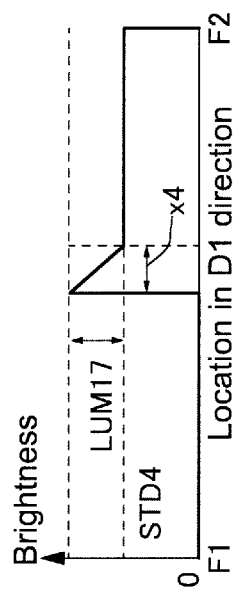
FIG. 12B is a diagram showing the brightness distribution at a location along a line F1-F2 of the uncorrected image corresponding to the light-emitting element of the first color of FIG. 12A.
Figure 12C:
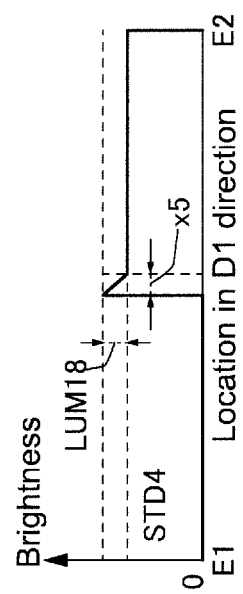
FIG. 12C is a diagram showing the brightness distribution at the location along a line E1-E2 of the uncorrected image corresponding to the light-emitting element of the first color of FIG. 12A.
Figure 12D:
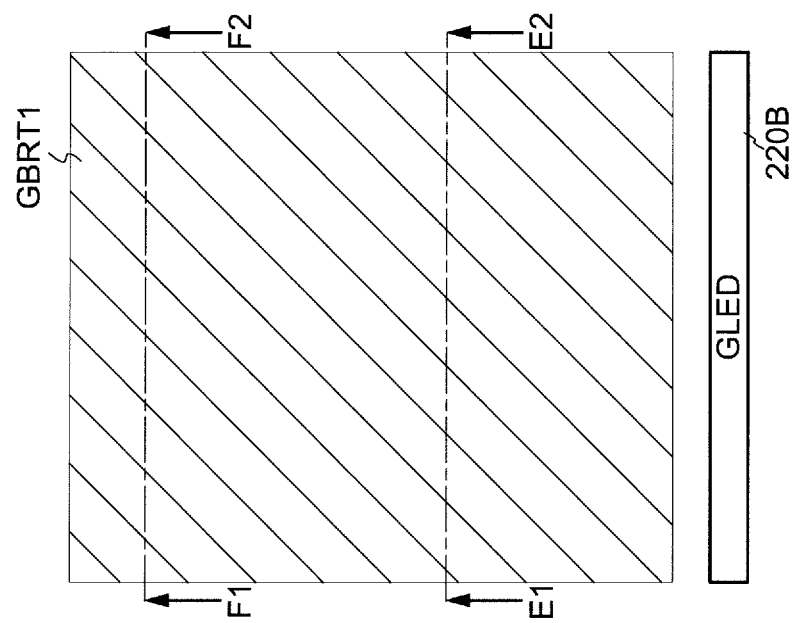
FIG. 12D is a diagram showing an uncorrected image corresponding to a light-emitting element of a second color among the uncorrected image data shown in FIG. 10B.
Figure 12E:
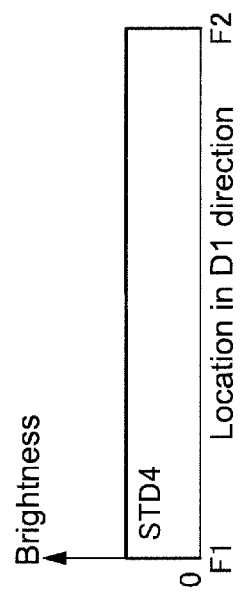
FIG. 12E is a diagram showing the brightness distribution at the location along the line F1-F2 of the uncorrected image corresponding to the light-emitting element of the second color of FIG. 12D.
Figure 12F:
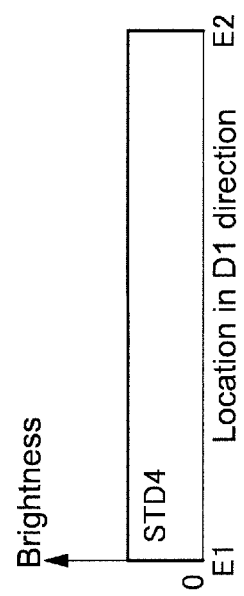
FIG. 12F is a diagram showing the brightness distribution at the location along the line E1-E2 of the uncorrected image corresponding to the light-emitting element of the second color of FIG. 12D.
Figure 12G:
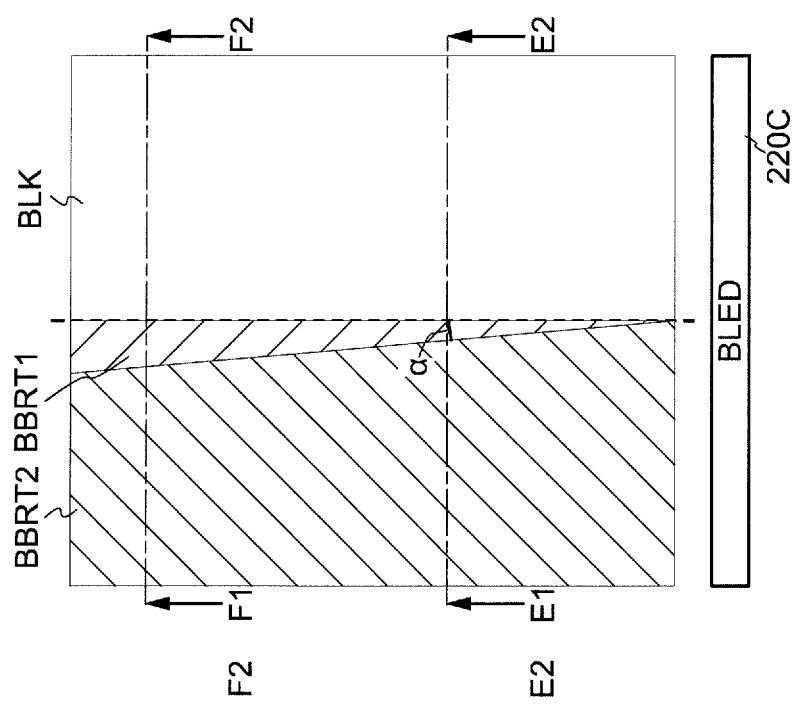
FIG. 12G is a diagram showing an uncorrected image corresponding to a light-emitting element of a third color among the uncorrected image data shown in FIG. 10B.
Figure 12H:
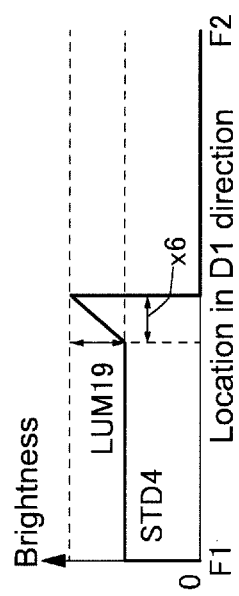
FIG. 12H is a diagram showing the brightness distribution at the location along the line F1-F2 of the uncorrected image corresponding to the light-emitting element of the third color shown in FIG. 12G.
Figure 12I:
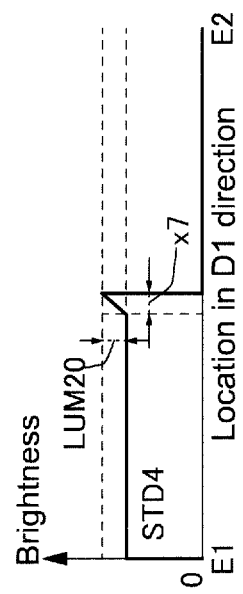
FIG. 12I is a diagram showing the brightness distribution at the location along the line E1-E2 of the uncorrected image corresponding to the light-emitting element of the third color of FIG. 12G.
Figure 13A:
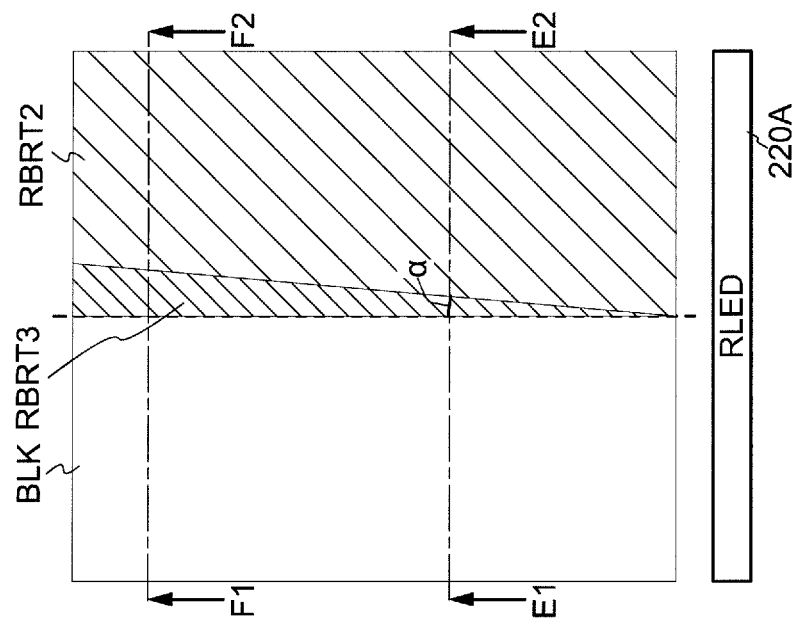
FIG. 13A is a diagram showing image data based on the correction coefficient corresponding to the light-emitting element of the first color among the image data based on the correction coefficient for the uncorrected image shown in FIG. 10B.
Figure 13B:
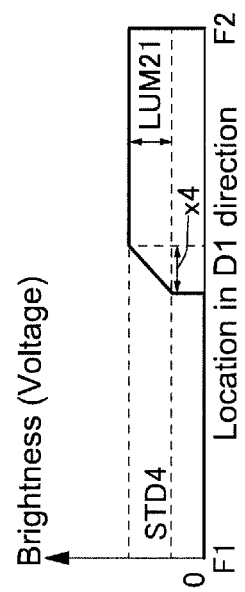
FIG. 13B is a diagram showing a voltage distribution at a location along the line F1-F2 of the image data based on a correction coefficient corresponding to the light-emitting element of the first color shown in FIG. 13A.
Figure 13C:
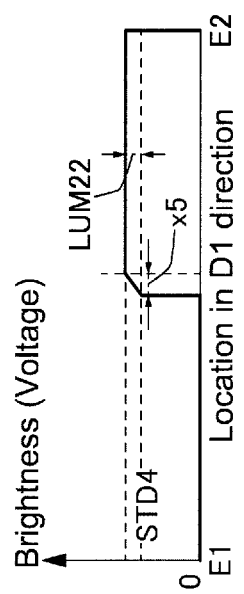
FIG. 13C is a diagram showing a voltage distribution at a location along the line E1-E2 of the image data based on a correction coefficient corresponding to the light-emitting element of the first color shown in FIG. 13A.
Figure 13D:
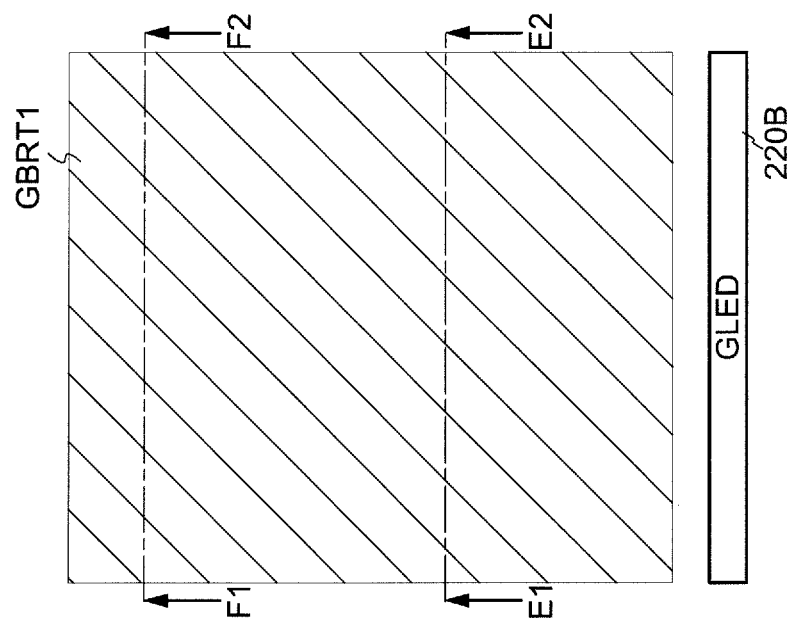
FIG. 13D is a diagram showing image data based on the correction coefficient corresponding to the light-emitting element of the second color among the image data based on the correction coefficient for the uncorrected image shown in FIG. 10B.
Figure 13E:
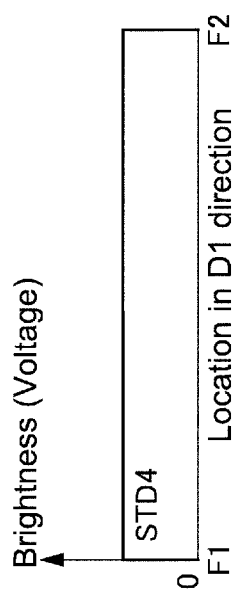
FIG. 13E is a diagram showing a voltage distribution at a location along the line F1-F2 of the image data based on a correction coefficient corresponding to the light-emitting element of the second color shown in FIG. 13D.
Figure 13F:
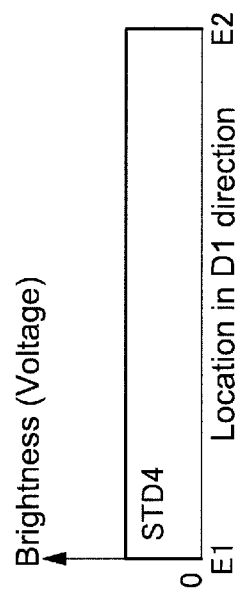
FIG. 13F is a diagram showing a voltage distribution at a location along the line E1-E2 of the image data based on a correction coefficient corresponding to the light-emitting element of the second color shown in FIG. 13D.
Figure 13G:
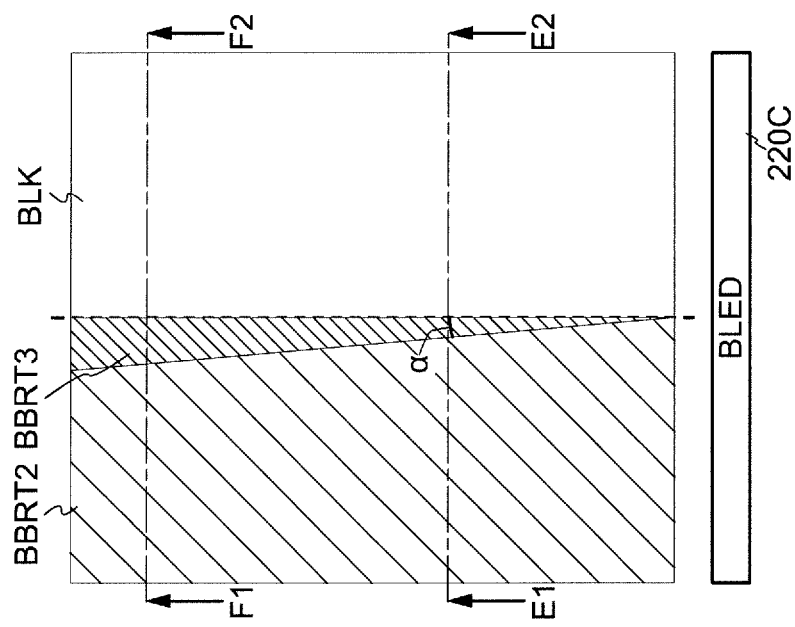
FIG. 13G is a diagram showing image data based on the correction coefficient corresponding to the light-emitting element of the third color among the image data based on the correction coefficient for the uncorrected image shown in FIG. 10B.
Figure 13H:
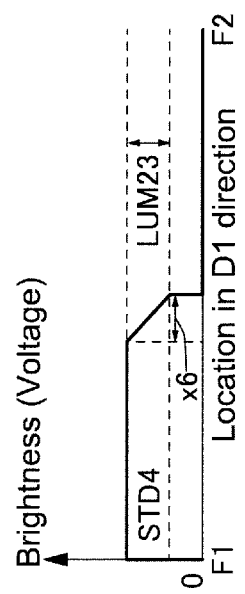
FIG. 13H is a diagram showing a voltage distribution at a location along the line F1-F2 of the image data based on a correction coefficient corresponding to the light-emitting element of the third color shown in FIG. 13G.
Figure 13I:
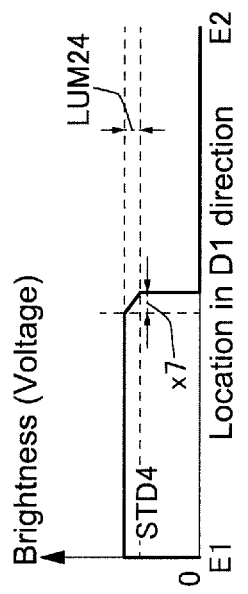
FIG. 13I is a diagram showing a voltage distribution at a location along the line E1-E2 of the image data based on a correction coefficient corresponding to the light-emitting element of the third color shown in FIG. 13G.
Figure 14A:
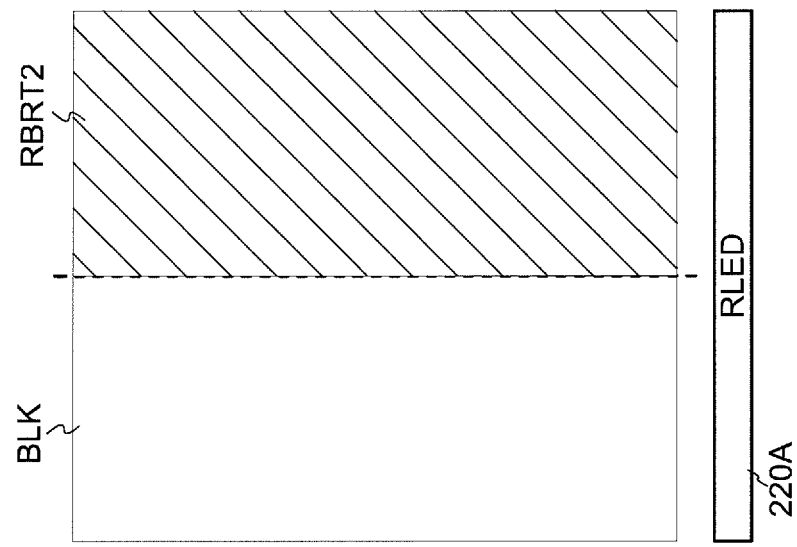
FIG. 14A is a diagram showing an image corresponding to a corrected light-emitting element of the first color displayed by a display panel according to an embodiment of the present invention.
Figure 14B:
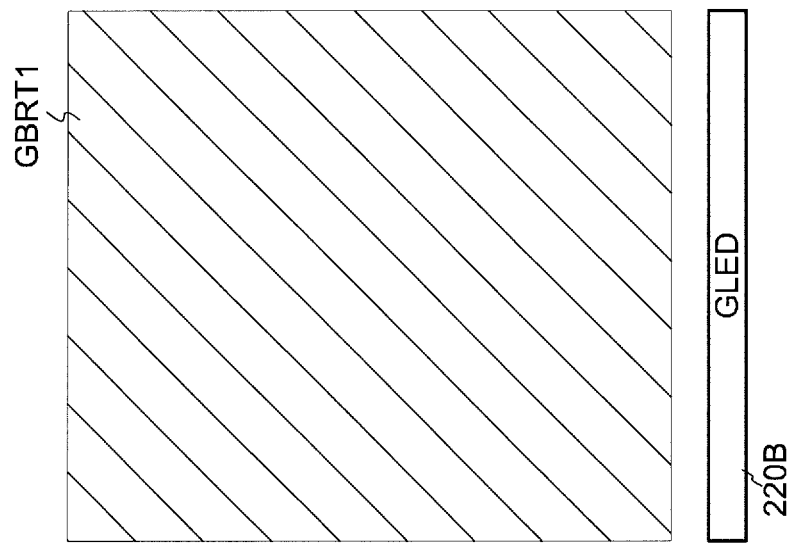
FIG. 14B is a diagram showing an image corresponding to a corrected light-emitting element of the second color displayed by a display panel according to an embodiment of the present invention.
Figure 14C:
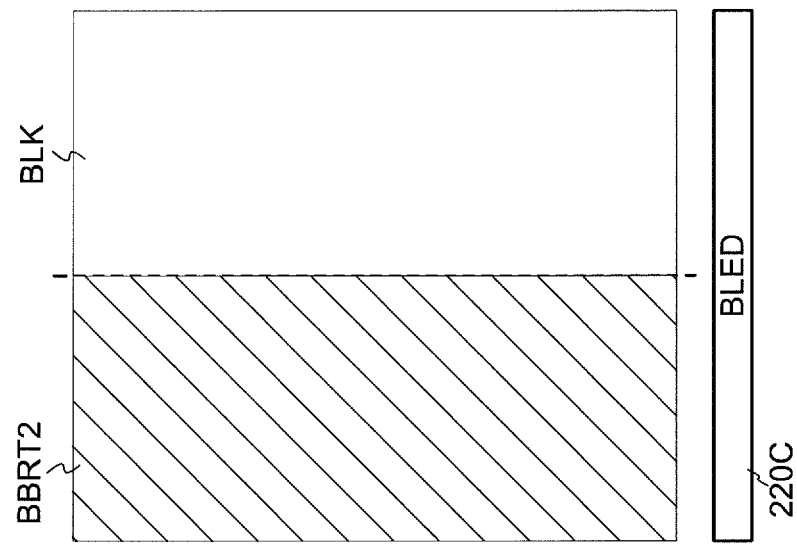
FIG. 14C is a diagram showing an image corresponding to a corrected light-emitting element of the third color displayed by a display panel according to an embodiment of the present invention.

In a correction example 4, the configuration and functions of the display panel 100 when displaying an image having a boundary in which the first image and the second image are adjacent to each other substantially perpendicular to or perpendicular to the first side 190S1 (light incident surface) will be described. FIG. 10A is a diagram showing an image corresponding to the uncorrected image data transmitted by the signal source 310 according to the present embodiment, and FIG. 10B is a diagram showing the uncorrected image displayed by the display panel 100 according to the present embodiment. FIG. 11A and FIG. 11B are diagrams for explaining a method of calculating a correction width according to an embodiment of the present invention. FIG. 12A is a diagram showing an uncorrected image corresponding to the light-emitting element 220A of the first color among the uncorrected image data shown in FIG. 10B, FIG. 12B is a diagram showing the brightness distribution at the location along an line F1-F2 of the uncorrected image corresponding to the light-emitting element 220A of the first color of FIG. 12A, and FIG. 12C is a diagram showing the brightness distribution at the location along an line E1-E2 of the uncorrected image corresponding to the light-emitting element 220A of the first color of FIG. 12A. FIG. 12D is a diagram showing an uncorrected image corresponding to the light-emitting element 220B of the second color among the uncorrected image data shown in FIG. 10B, FIG. 12E is a diagram showing a brightness distribution at the location along the line F1-F2 of the uncorrected image corresponding to the light-emitting element 220B of the second color shown in FIG. 12D, and FIG. 12F is a diagram showing a brightness distribution at the location along the line E1-E2 of the uncorrected image corresponding to the light-emitting element 220B of the second color shown in FIG. 12D. FIG. 12G is a diagram showing an uncorrected image corresponding to the light-emitting element 220C of the third color among the uncorrected image data shown in FIG. 10B, FIG. 12H is a diagram showing the brightness distribution at the location along the line F1-F2 of the uncorrected image corresponding to the light-emitting element 220C of the third color shown in FIG. 12G, and FIG. 12I is a diagram showing the brightness distribution at the location along the line E1-E2 of the uncorrected image corresponding to the light-emitting element 220C of the third color shown in FIG. 12G. FIG. 13A is a diagram showing image data based on the correction coefficient corresponding to the light-emitting element 220A of the first color among the image data based on the correction coefficient for the uncorrected image shown in FIG. 10B, and FIG. 13B is a diagram showing a voltage distribution at a location along the line F1-F2 of the image data based on a correction coefficient corresponding to the light-emitting element 220A of the first color shown in FIG. 13A, and FIG. 13C is a diagram showing a voltage distribution at a location along the line E1-E2 of the image data based on a correction coefficient corresponding to the light-emitting element 220A of the first color shown in FIG. 13A. FIG. 13D is a diagram showing image data based on the correction coefficient corresponding to the light-emitting element 220B of the second color among the image data based on the correction coefficient for the uncorrected image shown in FIG. 10B. FIG. 13E is a diagram showing a voltage distribution at a location along the line F1-F2 of image data based on a correction coefficient corresponding to the light-emitting element 220B of the second color shown in FIG. 13D, and FIG. 13F is a diagram showing a voltage distribution at a location along the line E1-E2 of image data based on a correction coefficient corresponding to the light-emitting element 220B of the second color shown in FIG. 13D. FIG. 13G is a diagram showing image data based on a correction coefficient corresponding to the light-emitting element 220C of the third color among the image data based on the correction coefficient for the uncorrected image shown in FIG. 10B, FIG. 13H is a diagram showing a voltage distribution at a location along the line F1-F2 of the image data based on a correction coefficient corresponding to the light-emitting element 220C of the third color shown in FIG. 13G, and FIG. 13I is a diagram showing a voltage distribution at a location along the line E1-E2 of the image data based on a correction coefficient corresponding to the light-emitting element 220C of the third color shown in FIG. 13G. FIG. 14A is a diagram showing an image corresponding to a corrected light-emitting element 220A of the first color displayed by a display panel according to the present embodiment. FIG. 14B is a diagram showing an image corresponding to a corrected light-emitting element 220B of the second color displayed by a display panel according to the present embodiment. FIG. 14C is a diagram showing an image corresponding to a corrected light-emitting element 220C of the third color displayed by a display panel according to the present embodiment. The configuration and function of the display panel 100 according to the fourth embodiment are not limited to the configurations shown in FIG. 10 to FIG. 14C. Description of the same or similar components as those of FIG. 1 to FIG. 9F may be omitted.

As shown in FIG. 10A, ideally, the display panel 100 displays an image having a boundary in which the first image and the second image are adjacent to each other parallel or substantially parallel to the second direction D2 perpendicular or substantially perpendicular to the lighting device 200 on the display area 102. For example, the hue of a first image CPT1 is cyan, and the hue of a second image YPT1 is yellow.

On the other hand, as shown in FIG. 10B, in practice, an image BPT1 is displayed in the vicinity of the boundary on the first image CPT1 side, and an image RPT1 is displayed in the vicinity of the boundary on the second image YPT1 side. This display of images on a display panel is referred to as coloring in this description. Coloring is due, for example, to the difference in the brightness due to the scattering of light in the vicinity of the boundary between the image in which different colors are displayed adjacent to each other. When the field sequential drive method is used, the light of the light-emitting element is incident obliquely to the pixels as the distance from the lighting device increases so that the coloring occurs more remarkably between the adjacent pixels. Since the display system 10 according to the present embodiment is not used in a display panel according to a comparative example, coloring occurs.

In the correction example 4 according to the present embodiment, as shown in FIG. 11, a value (correction width) for correcting the uncorrected image data is calculated according to the distance from the first side 190S1 of the lighting device 200 side in the display area 102.

For example, as shown in FIG. 11A, it is assumed that a black image BLK is displayed on half of the display area, a bright image BRT2 is displayed on a part of the remaining area, and a colored image BRT1 is displayed on the image BRT2 side at the border between the black image BLK and the image BRT2. A light incident angle α is, for example, a product-specific angle determined by the product. Specifically, the light incident angle α is an angle determined by a light-emitting diode or a prism (not shown) adjacent to the light-emitting diode. The display control unit 320 obtains the area of the image BRT2 by scanning the image in the first direction D1 and scanning the image in the second direction D2. The display control unit 320 grasps a distance y1 from the first side 190S1 using a location of the image area to be corrected and can grasp the boundary between the image BRT2 and the image BRT1 using the light incident angle α. The display control unit 320 can calculate a correction width x1 parallel to the first direction D1 of the image area to be corrected using the distance y1, the light incident angle α, and Equation (1).

[Equation 1]

$$x1 = y1 \times \tan \alpha \quad (1)$$

The display control unit 320 can calculate, for example, a correction width x2 and a correction width x3 parallel to the first direction D1 of the image area to be corrected shown in FIG. 11B using Equations (2) and (3), respectively.

[Equation 2]

$$x2 = y2 \times \tan \alpha \quad (2)$$

[Equation 3]

$$x3 = y3 \times \tan \alpha \quad (3)$$

A specific correction method will be described with reference to FIG. 12A to FIG. 14C. For example, the case where the uncorrected image data shown in FIG. 10B is corrected will be described. As described in the correction example 1, the image becomes darker from the side closer to the lighting device 200 toward the side farther from the lighting device 200. However, in the description herein, it is once excluded that the image becomes darker from the side closer to the lighting device 200 toward the side farther from the lighting device 200. The light-emitting element 220A is a red light-emitting element, for example a red light-emitting diode RLED. The light-emitting element 220B is a green light-emitting element, for example a green light-emitting diode GLED. The light-emitting element 220C is a blue light-emitting element, for example a blue light-emitting diode BLED.

In FIG. 10B, it is assumed that the hue of the first image CPT1 is cyan and the hue of the second image YPT1 is yellow. Therefore, as shown in FIG. 12A, for example, with respect to the first image CPT1, the uncorrected image corresponding to the light-emitting element of the first color is the black image BLK, with respect to the second image YPT1, the uncorrected image corresponding to the light-emitting element 220A of the first color is a red image RBRT2 (image RBRT2), and the image at the boundary is a bright red image RBRT1 (image RBRT1).

As shown in FIG. 12B, in the brightness distribution at the location along the line F1-F2 of the uncorrected image, the brightness in the area of the image BLK is 0 or near 0, the brightness at the boundary of the image BLK and the image RBRT1 increases to brightness LUM17, the brightness at the distance of a width x4 in the D1 direction from the boundary between the image BLK and the image RBRT1 is brightness STD4, and the brightness past the width x5 in the direction D1 up to F2 is the brightness STD4. As shown in FIG. 12C, in the brightness distribution at the location along the line E1-E2 of the uncorrected image, the brightness is 0 or near 0 in the area of the image BLK, the brightness at the boundary between the image BLK and the image RBRT1 increases to brightness LUM18, the brightness at the distance of a width x5 in the direction D1 from the boundary between the image BLK and the image RBRT1 is the brightness STD4, and the brightness past the width x4 in the direction D1 up to F2 is the brightness STD4. The width x5 in the direction D1 is smaller than the width x4 in the direction D1.

As shown in FIG. 12D, for example, with respect to the first image CPT1 and the second image YPT1, the uncorrected image corresponding to the light-emitting element 220B of the second color is a green image GBRT1. As shown in FIG. 12E, the brightness at the location along the line F1-F2 of the uncorrected image is the brightness STD4 without depending on the display area. As shown in FIG. 12F, the brightness at the location along the line E1-E2 of the uncorrected image does not depend on the display area. That is, similar to the brightness at the location along the line F1-F2 of the uncorrected image, the brightness at the location along the line E1-E2 of the uncorrected image is the brightness STD4.

As shown in FIG. 12G, for example, with respect to the first image CPT1, the uncorrected image corresponding to the light-emitting element 220C of the third color is a blue image BBRT2 (image BBRT2), the image at the boundary is a bright blue image BBRT1 (image BBRT1), and with respect to the second image YPT1, the uncorrected image corresponding to the light-emitting element 220C of the third color is the black image BLK.

As shown in FIG. 12H, in the brightness distribution at the location along the line F1-F2 of the uncorrected image, the brightness at the area of the image BBRT2 is constant at the brightness STD4. The brightness at the boundary between the image BBRT2 and the image BBRT1 increases from the brightness STD4 to the brightness STD4+brightness LUM19 at a distance of a width x6 in the direction D1. In addition, the brightness is near 0 or 0 in the area of the image BLK. As shown in FIG. 12I, in the brightness distribution at the location along the line E1-E2 of the uncorrected image, the brightness at the area of the image BBRT2 is constant at the brightness STD4. The brightness at the boundary between the image BBRT2 and the image BBRT1 increases from the brightness STD4 to the brightness STD4+brightness LUM20 at a distance of a width x7 in the direction D1. In addition, the brightness is near 0 or 0 in the area of the image BLK. The width x7 in the direction D1 is smaller than the width x6 in the direction D1.

An image data based on the correction coefficient for the uncorrected image will be described using FIG. 13A to FIG. 13I. As shown in FIG. 13A, for example, with respect to the first image CPT1, the image data based on the correction coefficient corresponding to the light-emitting element of the first color is the black image BLK (image BLK), with respect to the second image YPT1, the image data based on the correction coefficient corresponding to the light-emitting element 220A of the first color is the red image RBRT2 (image RBRT2), and with respect to the image at the boundary, the image data based on the correction coefficient corresponding to the light-emitting element of the first color is a dark red image RBRT3 (image RBRT3).

As shown in FIG. 13B, the brightness distribution at the location along the line F1-F2 of the image data based on the correction coefficient is 0 or near 0 in the area of the image BLK. The brightness at the boundary between the image BLK and the image RBRT3 is the brightness STD4−brightness LUM21. Furthermore, the brightness at a distance of the width x4 in the direction D1 from the boundary between the image BLK and the image RBRT3 increases from the brightness STD4−the brightness LUM21 to the brightness STD4. In addition, the brightness past the width x4 in the direction D1 up to F2 is the brightness STD4. As shown in FIG. 13C, the brightness distribution at the location along the line E1-E2 of the image of the image data based on the correction coefficient is 0 or near 0 in the area of the image BLK. The brightness at the boundary between the image BLK and the image RBRT3 is the brightness STD4−brightness LUM22. The brightness at a distance of the x5 in the direction D1 from the boundary between the image BLK and the image RBRT3 is the brightness STD4. In addition, the brightness past the D1 direction width x5 up to E2 is the brightness STD4. The D1 direction width x5 is smaller than the D1 direction width x4.

As shown in FIG. 13D, for example, with respect to the first image CPT1 and the second image YPT1, the image data based on the correction coefficient corresponding to the light-emitting element 220B of the second color is the green image GBRT1. As shown in FIG. 13E, the brightness at the location along the line F1-F2 of the uncorrected image is the brightness STD4 without depending on the display area. As shown in FIG. 13F, the brightness at the location along the line E1-E2 of the uncorrected image does not depend on the display area. That is, similar to the brightness at the location along the line F1-F2 of the uncorrected image, the brightness at the location along the line E1-E2 of the uncorrected image is the brightness STD4.

As shown in FIG. 13G, for example, with respect to the first image CPT1, the image data based on the correction coefficient corresponding to the light-emitting element 220C of the third color is the blue image BBRT2 (image BBRT2), the image at the boundary is a dark blue image BBRT3 (image BBRT3), and with respect to the second image YPT1, the uncorrected image corresponding to the light-emitting element 220C of the third color is the black image BLK.

As shown in FIG. 13H, in the brightness distribution at the location along the line F1-F2 of the image data based on the correction coefficient, the brightness in the area of the image BBRT2 is constant at the brightness STD4. The brightness at the border between the image BBRT2 and the image BBRT3 decreases from the brightness STD4 to the brightness STD4−brightness LUM23 at a distance of the width x6 in the direction D1. In addition, the brightness is 0 or near 0 in the area of the image BLK. As shown in FIG. 13I, in the brightness distribution at the location along the line E1-E2 of the image data based on the correction coefficient, the brightness in the area of the image BBRT2 is constant at the brightness STD4. The brightness at the boundary between the image BBRT2 and the image BBRT3 decreases from the brightness STD4 to the brightness STD4−brightness LUM24 at a distance of the width x7 in the direction. In addition, the brightness is 0 or near 0 in the area of the image BLK. The width x7 in the direction D1 is smaller than the width x6 in the direction D1.

A corrected image will be described with reference to FIG. 14A to FIG. 14C. The display system 10 generates an image corresponding to a corrected red light-emitting element using the uncorrected image and the image data based on the correction coefficient for the image corresponding to the red light-emitting element. The image corresponding to the corrected red light-emitting element is the image shown in FIG. 14A. Similarly, the display system 10 generates an image corresponding to a corrected green light-emitting element (FIG. 14B) using the uncorrected image corresponding to the green light-emitting element and the image data based on the correction coefficient and generates an image corresponding to a corrected blue light-emitting element (FIG. 14C) using the uncorrected image corresponding to the blue light-emitting element and the image data based on the correction coefficient.

As described above, in the display system 10 according to the correction example 4, with respect to the image including the coloring due to the difference in the brightness near the boundary of the image in which the different colors are displayed adjacent to each other, the corrected image data is generated in the image data with high brightness by using the image data based on the correction coefficient that makes the brightness lower, and the corrected image data is generated in the image data with low brightness by using the image data based on the correction coefficient that makes the brightness higher. Consequently, the display system 10 according to the fourth correction example corrects the coloring before correction and displays an image that exhibits brightness with suppressed coloring on the display panel 100.

The brightness STD1 to the brightness STD4 and the brightness LUM1 to the brightness LUM24 shown in the correction example 1, the correction example 2, the correction example 3, and the correction example 4 indicate the reference values of the brightness, and the actual brightness does not necessarily correspond to the brightness STD1 to the brightness STD4 and the brightness LUM1 to the brightness LUM24.

2. Second Embodiment

Figure 15:
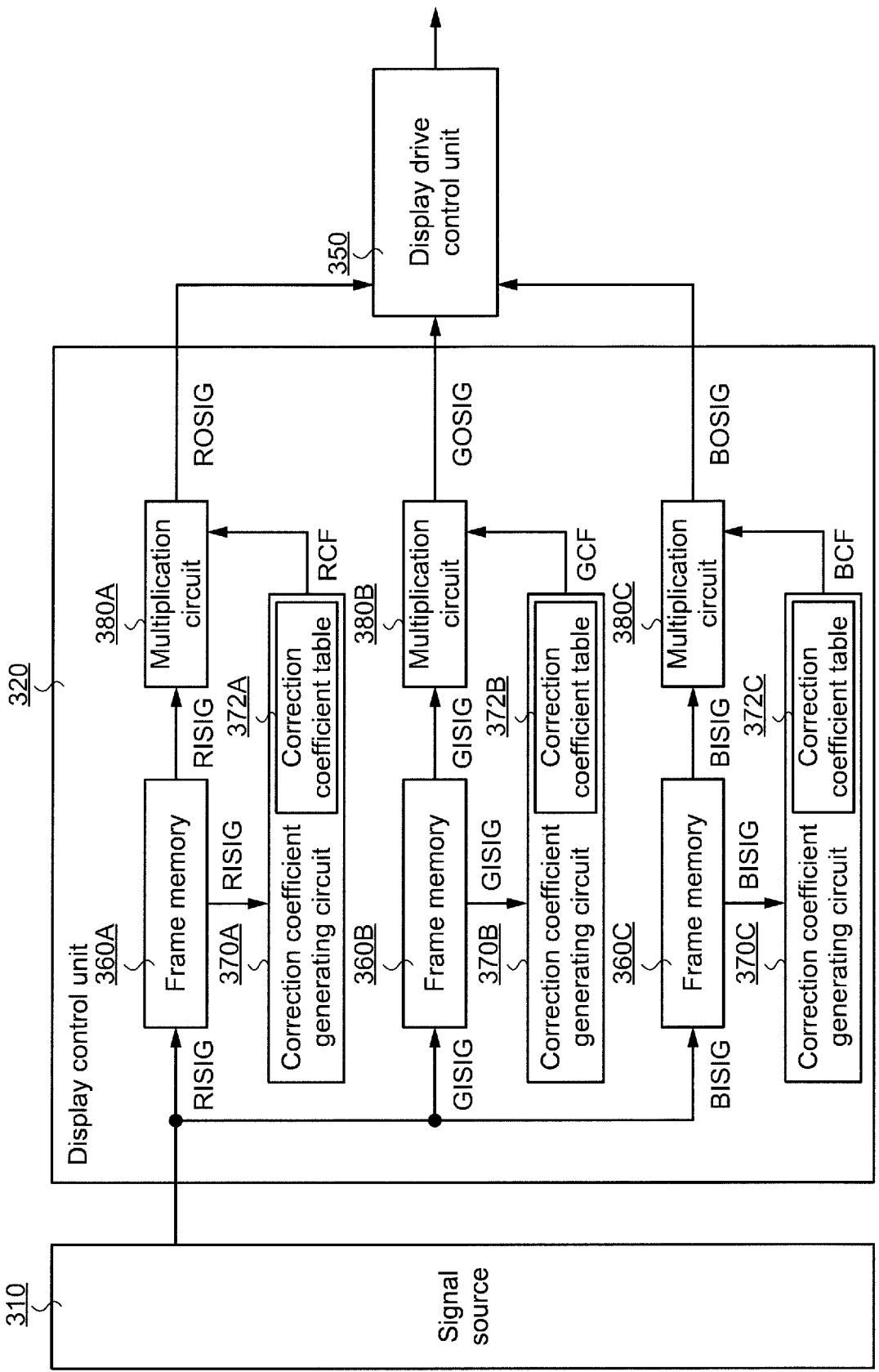
FIG. 15 is a diagram showing a part of a control device according to an embodiment of the present invention.
Figure 16:
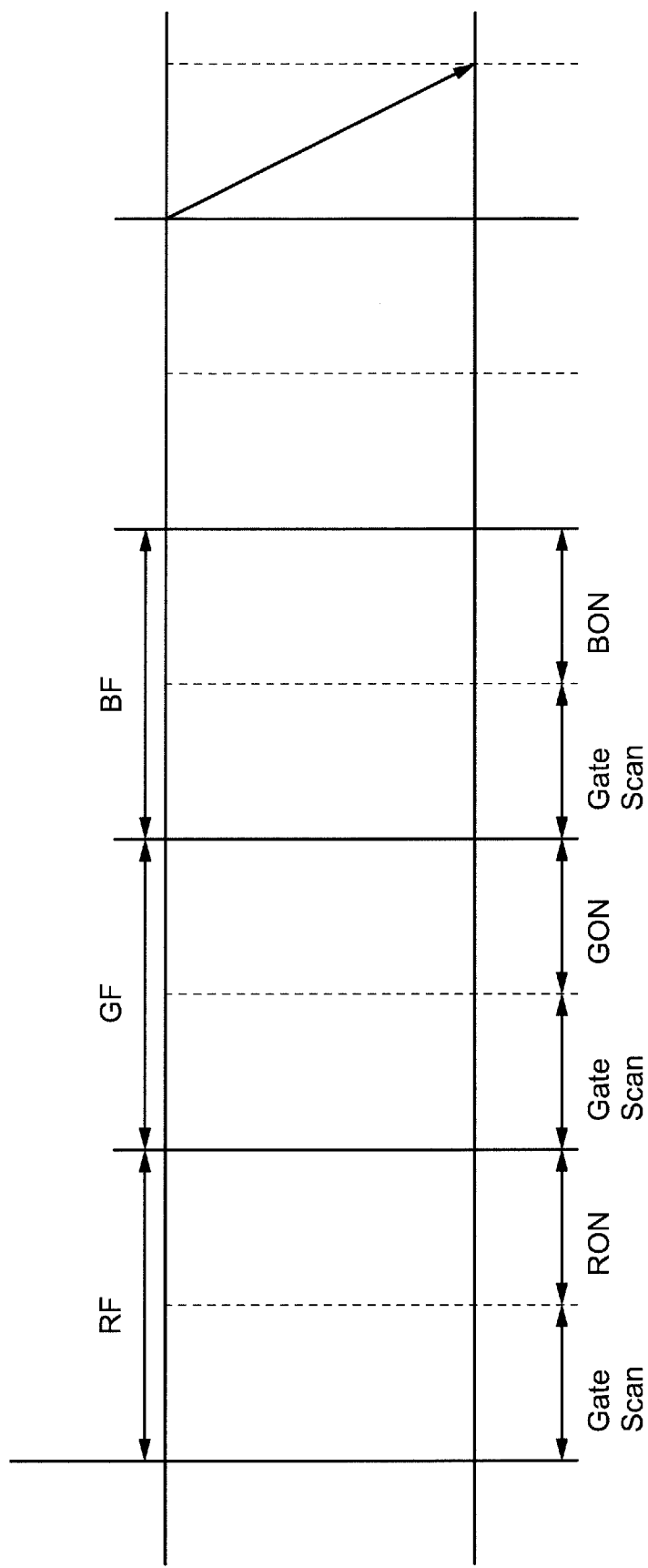
FIG. 16 is a timing chart for explaining a timing at which a light-emitting element according to an embodiment of the present invention emits light.
Figure 17A:
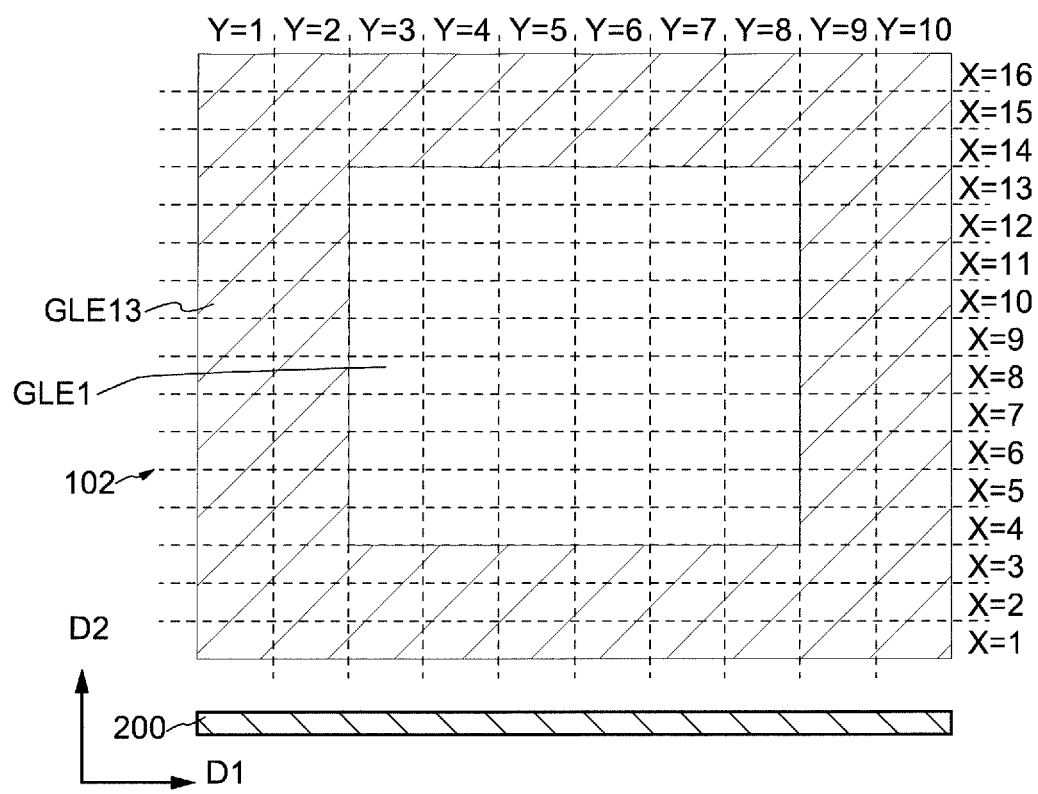
FIG. 17A is a diagram showing an image corresponding to uncorrected image data transmitted by a signal source according to an embodiment of the present invention.
Figure 18A:
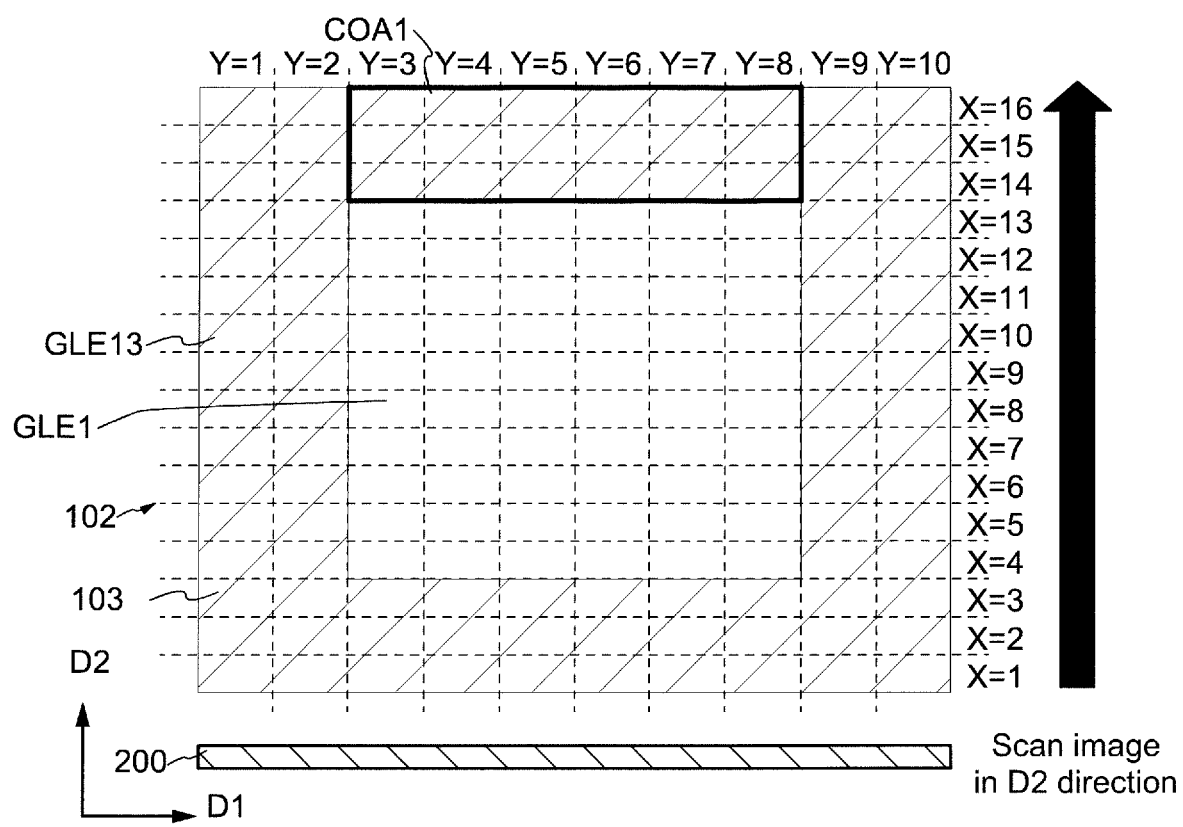
FIG. 18A is a diagram showing a correction area when scanned in a direction D2 for the image shown in FIG. 17A.
Figure 19A:
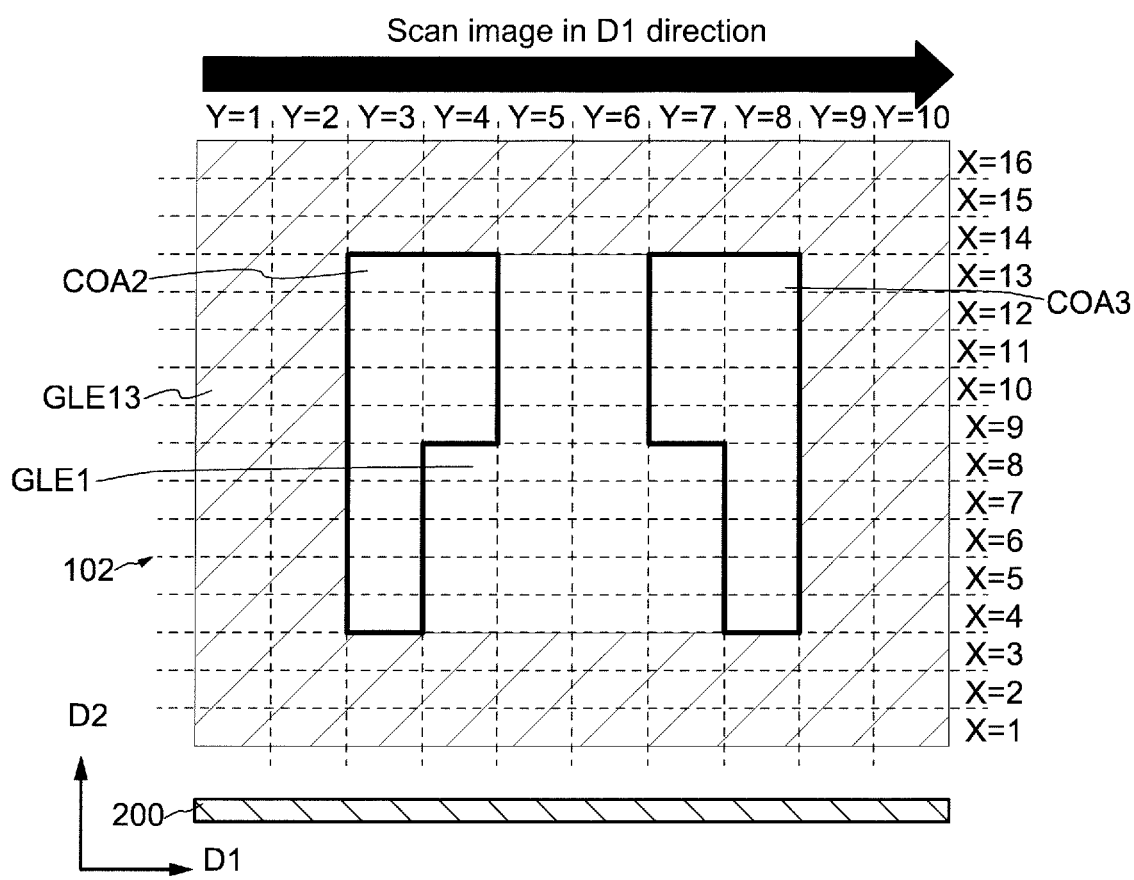
FIG. 19A is a diagram showing a correction area when scanned in a direction D1 for the image shown in FIG. 17A.
Figure 20:
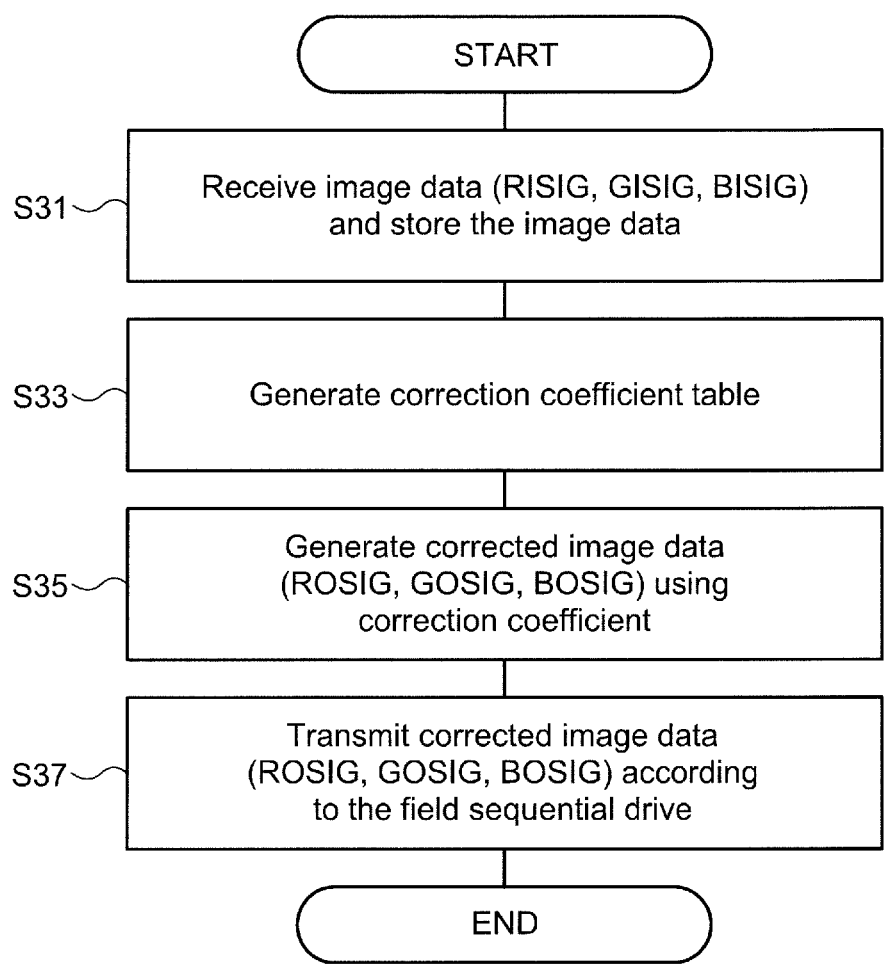
FIG. 20 is a flowchart for explaining a drive method according to an embodiment of the present invention.

The second embodiment is an embodiment showing a drive method of the display system 10 according to the present embodiment. FIG. 15 is a diagram showing a part of the control device 300 according to the present embodiment. FIG. 16 is a timing chart for explaining the timing at which the light-emitting element 220 of the first color according to the present embodiment emits light. FIG. 17A is a diagram showing an image corresponding to the uncorrected image data transmitted by the signal source 310 according to the present embodiment. FIG. 17B is a diagram showing correction coefficients for the brightness gradient with or without a white window. FIG. 18A is a diagram showing a correction area when scanned in the direction D2 for the image shown in FIG. 17A. FIG. 18B is a diagram showing correction coefficients corresponding to the image data in the correction area of FIG. 18A. FIG. 19A is a diagram showing a correction area when scanned in the direction D1 for the image shown in FIG. 17A. FIG. 19B is a diagram showing correction coefficients corresponding to the image data in the correction area of FIG. 19A. FIG. 20 is a flowchart for explaining the drive method according to the present embodiment. The configuration of the display system 10 is not limited to the configurations shown in FIG. 15 to FIG. 20. The configuration and function of the drive method of the display system 10 are not limited to the configurations shown in FIG. 15 to FIG. 20. Description of the same or similar components as those of FIG. 1 to FIG. 14C may be omitted.

2-1. Configuration of Display Control Unit 320

As shown in FIG. 15, the display control unit 320 includes a frame memory 360A, a frame memory 360B, a frame memory 360C, a correction coefficient generating circuit 370A, a correction coefficient generating circuit 370B, a correction coefficient generating circuit 370C, a correction coefficient table 372A, a correction coefficient table 372B, a correction coefficient table 372C, a multiplication circuit 380A, a multiplication circuit 380B, and a multiplication circuit 380C. The correction coefficient generating circuit 370A includes the correction coefficient table 372A, the correction coefficient generating circuit 370B includes the correction coefficient table 372B, and the correction coefficient generating circuit 370C includes the correction coefficient table 372C.

The frame memory 360A, the frame memory 360B, and the frame memory 360C are electrically connected to the signal source 310. The frame memory 360A is electrically connected to the correction coefficient generating circuit 370A and the multiplication circuit 380A, the frame memory 360B is electrically connected to the correction coefficient generating circuit 370B and the multiplication circuit 380B, and the frame memory 360C is electrically connected to the correction coefficient generating circuit 370C and the multiplication circuit 380C.

2-2. Drive Method of Display System 10

A method for driving the display system 10 will be described with reference to FIG. 20 and FIG. 15. As shown in FIG. 20, when the display system 10 starts driving, in step 31 (S31), the signal source 310 transmits an image signal RISIG to the frame memory 360A, transmits an image signal GISIG to the frame memory 360B, and transmits the image signal BISIG to the frame memory 360C. The frame memory 360A transmits the image signal RISIG to the correction coefficient generating circuit 370A and the multiplication circuit 380A, the frame memory 360B transmits the image signal GISIG to the correction coefficient generating circuit 370B and the multiplication circuit 380B, and the frame memory 360C transmits the image signal BISIG to the correction coefficient generating circuit 370C and the multiplication circuit 380C.

Next, in step 33 (S33), the correction coefficient generating circuit 370A generates a correction coefficient using the image signal RISIG. The correction coefficient generating circuit 370A stores a generated correction coefficient RCF in the correction coefficient table 372A. The correction coefficient generating circuit 370B uses the image signal GISIG to generate a correction coefficient. The correction coefficient generating circuit 370B stores a generated correction coefficient GCF in the correction coefficient table 372B. The correction coefficient generating circuit 370C uses the image signal BISIG to generate a correction coefficient. The correction coefficient generating circuit 370C stores a generated correction coefficient BCF in the correction coefficient table 372C.

Next, in step 35 (S35), the multiplication circuit 380A generates the corrected image signal ROSIG using the image signal RISIG and the correction coefficient RCF. The multiplication circuit 380B generates the corrected image signal GOSIG using the image signal GISIG and the correction coefficient GCF. The multiplication circuit 380C generates the corrected image signal BOSIG using the image signal BISIG and the correction coefficient BCF. The multiplication circuit 380A transmits the generated corrected image signal ROSIG to the display drive control unit 350. The multiplication circuit 380B transmits the generated corrected image signal GOSIG to the display drive control unit 350. The multiplication circuit 380C transmits the generated corrected image signal BOSIG to the display drive control unit 350.

Next, in step 37 (S37), the display system 10 transmits the generated corrected image signal ROSIG, the corrected image signal GOSIG, and the corrected image signal BOSIG to the display drive control unit 350 using the field sequential drive method.

The display drive control unit 350 uses, for example, a switch (not shown) of the display drive control unit 350 and the display control signal according to the timing chart shown in FIG. 16, to switch the output of the multiplication circuit 380A, the multiplication circuit 380B, and the multiplication circuit 380C at a desired timing and transmits the corrected image signal ROSIG, the corrected image signal GOSIG, and the corrected image signal BOSIG to the display panel 100 in order. Consequently, the display panel 100 can display the corrected image using the corrected image signal ROSIG, the corrected image signal GOSIG, and the corrected image signal BOSIG. In this way, driving of the display system 10 is complete.

An example of the field sequential drive method will be described with reference to FIG. 16. First, a drive method of a light emission period RON of the first color in a first sub-frame (first predetermined time) RF is described. The display drive control unit 350 selects the corrected image signal ROSIG from the image signals (corrected image signals ROSIG, GOSIG, and BOSIG (FIG. 15)) based on the display control signal. The display drive control unit 350 transmits the display control signal and the corrected image signal ROSIG to the drive circuit 106. Subsequently, in the entire display panel 100, the corrected image data according to the corrected image signal ROSIG is transmitted to the pixel 103 selected within one vertical scan period GateScan via the drive circuit 106 and the signal line 147*b* described above. In the light emission period RON of the first color, since only the light-emitting element 220A of the first color is illuminated, the pixel can display an image corresponding to the corrected image data corresponding to the corrected image signal ROSIG. The corrected image data according to the corrected image signal ROSIG includes a voltage (gradation) corresponding to the image data of the image signal ROSIG.

Next, a drive method of a light emission period GON of the second color in a second sub-frame GF will be described. The display drive control unit 350 selects the corrected image signal GOSIG from the image signals (corrected image signals ROSIG, GOSIG, and BOSIG (FIG. 15)) based on the display control signal. The display drive control unit 350 transmits the display control signal and the corrected image signal GOSIG to the drive circuit 106. Subsequently, in the entire display panel 100, the corrected image data according to the corrected image signal GOSIG is transmitted to the pixel 103 selected within the one vertical scan period GateScan via the drive circuit 106 and the signal line 147b described above. In the light emission period GON of the second color, since only the light-emitting element 220B of the second color is illuminated, the pixel can display an image corresponding to the corrected image data corresponding to the corrected image signal GOSIG. The corrected image data according to the corrected image signal GOSIG includes a voltage (gradation) corresponding to the image data of the image signal GOSIG.

Furthermore, a drive method of a light emission period BON of the third color in a third sub-frame (third predetermined time) BF. The light emission control unit 340 controls the switch in the light emission control unit 340 using the light source control signal to emit light only the light-emitting element 220C of the third color. The display drive control unit 350 selects the corrected image signal BOSIG from the image signals (corrected image signals ROSIG, GOSIG, and BOSIG (FIG. 15)) based on the display control signal. The display drive control unit 350 transmits the display control signal and the corrected image signal BOSIG to the drive circuit 106. Subsequently, in the entire display panel 100, the corrected image data according to the corrected image signal BOSIG is transmitted to the pixel 103 selected within the one vertical scan period GateScan via the drive circuit 106 and the signal line 147b described above. In the light emission period BON of the third color, since only the light-emitting element 220C of the third color is illuminated, the pixel can display an image corresponding to the corrected image data corresponding to the corrected image signal BOSIG. The corrected image data according to the corrected image signal BOSIG includes a voltage (gradation) corresponding to the image data of the image signal BOSIG.

In the display system 10 according to the present embodiment, the display panel 100 can display a combined image of three colors in one frame (1F) by using the field sequential method. Therefore, in the display system 10 according to the present embodiment, a color filter is unnecessary. Therefore, in the display panel 100 according to the present embodiment, the light-absorbing loss in the color filter is reduced. As a result, high transmittance can be realized in the display panel 100. In a color filter method, one pixel is made by sub-pixels obtained by dividing the pixel 103 for each of the first color, the second color, and the third color, whereas in the field sequential method, it is not necessary to divide the pixel into sub-pixels. It is also possible to have a light-emitting element 220D that emits a fourth color differing from the first color, the second color, and the third color and only for the light-emitting element to emit light of the fourth color in a fourth sub-frame.

2-3. Method of Generating Correction Coefficient Table 372

An example of a method of generating the correction coefficient table 372 in Step 33 (S33) will be described with reference to FIG. 17A to FIG. 19B. The example shown in FIG. 17A to FIG. 19B is an example of a method of generating the correction coefficient table 372 shown in the correction example 2 or correction example 4.

As shown in FIG. 17A, for example, the display area 102 includes the pixel 103 arranged in a matrix of Y=10 sections, X=16 sections. In the present embodiment, when each pixel 103 is expressed, it is described as a pixel (X, Y). For example, a pixel of X=2 and Y=4 is described as the pixel (2, 4).

As shown in FIG. 17A, the pixel 103 in a pixel (1, Y) in the 1st row, a pixel (2, Y) in the 2nd row, a pixel (3, Y) in the 3rd row, a pixel (4, 1) to a pixel (13, 1) in the 4th row 1st column to the 13th row 2nd column, a pixel (4, 2) to a pixel (13, 2) in the 4th row 2nd column to the 13th row 2nd column, a pixel (4, 9) to a pixel (13, 9) in the 4th row 9th column to the 13th row 9th column, a pixel (4, 10) to a pixel (13, 10) in the 4th row 10th column to the 13th row 10th column, a pixel in the 14th row (14, Y), a pixel in the 15th row (15, Y), and a pixel in the 16th row (16, Y) display an image of halftone brightness GLE13. The pixel 103 in a pixel (4, 3) to a pixel (4, 8) in the 4th row 3rd column to the 4th row 8th column, a pixel (5, 3) to a pixel (5, 8) in the 5th row 3rd columns to the 5th row to 8th column, a pixel (6, 3) to a pixel (6, 8) in the 6th row 3rd column to the 6th row 8th column, a pixel (7, 3) to a pixel (7, 8) in the 7th row 3rd column to the 7th row 8th column, a pixel (8, 3) to a pixel (8, 8) in the 8th row 3rd column to the 8th row 8th column, a pixel (9, 3) to a pixel (9, 8) in the 9th row 3rd row to the 9th row 8th column, a pixel (10, 3) to a pixel (10, 8) in the 10th row 3rd column to the 10th row 8th column, a pixel (11, 3) to a pixel (11, 8) in the 11th row 3rd column to the 11th row 8th column, a pixel (12, 3) to a pixel (12, 8) in the 12th row 3rd column to the 12th row 8 column, and a pixel (13, 3) to a pixel (13, 8) in the 13th row 3rd column to the 13th row 8th column display an image of the white brightness GLE1.

The correction coefficient generating circuit 370 receives the image signal stored in the frame memory (FIG. 15) and generates a correction coefficient. In the present embodiment, the reference value of the correction coefficient is 1.0 as an example. As shown in FIG. 17B, the correction coefficient is set so that the brightness of the pixel 103 on the side closer to the lighting device 200 becomes smaller, and the correction coefficient is set so that the brightness of the pixel 103 on the side farther from the lighting device 200 becomes larger. For example, the correction coefficient of the pixel (2, 3) is 0.6, the correction coefficient of a pixel (10, 6) is 0.9, and the correction coefficient of a pixel (14, 9) is 1.0.

Next, the display system 10 scans (first scan) the image in the direction D2 and detects a change point from the bright image with high brightness to the dark image with low brightness and a change point from the dark image with low brightness to the bright image with high brightness. The display system 10 transmits the scan result to the correction coefficient generating circuit 370. The correction coefficient generating circuit 370 extracts the change point using the scan result and lowers the brightness of the pixel included in the area farther from the lighting device 200 than the change point changed from the dark image with lower brightness to the bright image with higher brightness. The correction coefficient generating circuit 370 increases the brightness of the pixel included in the area farther from the lighting device 200 from the change point changed from the bright image with higher brightness to the dark image with lower brightness.

Specifically, the pixel 103 included in an area COA1 shown in FIG. 18A is a pixel in the previous area that has changed from the bright image with high brightness (white image) to the dark image with low brightness (halftone image). Therefore, the correction coefficient of the pixel 103 included in the area COA1 is, for example, 0.1 added to 1.0 to set the correction coefficient as 1.1.

Next, the display system 10 scans (second scan) the image in the direction D1 and detects a change point from the bright image with high brightness to the dark image with low brightness and a change point from the dark image with low brightness to the bright image with high brightness. The display system 10 transmits the scan result to the correction coefficient generating circuit 370. The correction coefficient generating circuit 370 extracts the change point using the scan result and lowers the brightness of the pixel included in the area on the brighter side for the change point that has changed from the dark image with lower brightness to the bright image with higher brightness. The correction coefficient generating circuit 370 lowers the brightness of the pixel included in the area on the brighter side for the change point that has changed from the bright image with higher brightness to the dark image with lower brightness.

Specifically, an area COA2 shown in FIG. 19A is a pixel in the previous area that has changed from the dark image with low brightness (halftone image) to the bright image with high brightness (white image). The pixel 103 included in an area COA3 is a pixel in the bright area with higher brightness compared to the change point that has changed from the bright image with high brightness (white image) to the dark image with low brightness (halftone image). The correction width is calculated using Equations (1) to (3). The pixel in the bright area with high brightness is corrected so that the brightness is lowered the closer the pixel is to the pixel in the dark area with low brightness. Therefore, as shown in FIG. 19B, the correction coefficient of the pixel 103 included in the area COA2 is subtracted, for example, from 0.9 by 0.1 or 0.2 to set the correction coefficient to 0.8 or 0.7. For example, the correction coefficient of a pixel (12, 4) becomes 0.8 by subtracting 0.1 from 0.9, and the correction coefficient of the pixel (12, 3) becomes 0.7 by subtracting 0.2 from 0.9.

As described above, the correction coefficient is generated, and the correction coefficient is stored in the correction coefficient table 372. Following step 33 (S33), in step 35 (S35), the multiplication circuit (FIG. 15) generates the corrected image signal using the image signal and the correction coefficient.

In the second embodiment, one correction coefficient is provided for one pixel. By providing one correction coefficient for one pixel, calculation processing between pixels can be omitted. As a result, for example, in the display system 10, it is possible to omit the circuit necessary for the calculation, to improve the calculation speed.

The configuration of the correction coefficient is not limited to the example of the second embodiment. For example, as described in the first embodiment, one correction coefficient may be provided for an area including a plurality of pixels. By providing one correction coefficient for the area including a plurality of pixels, it is possible to reduce the usage of the frame memories. Alternatively, the amount of frame memories can be reduced.

The configuration of the correction coefficient can be appropriately changed based on the pattern of an image to be displayed or, the details of occurrence of display unevenness, and the like within a range not deviating from the present embodiment.

3. Third Embodiment

Figure 21:
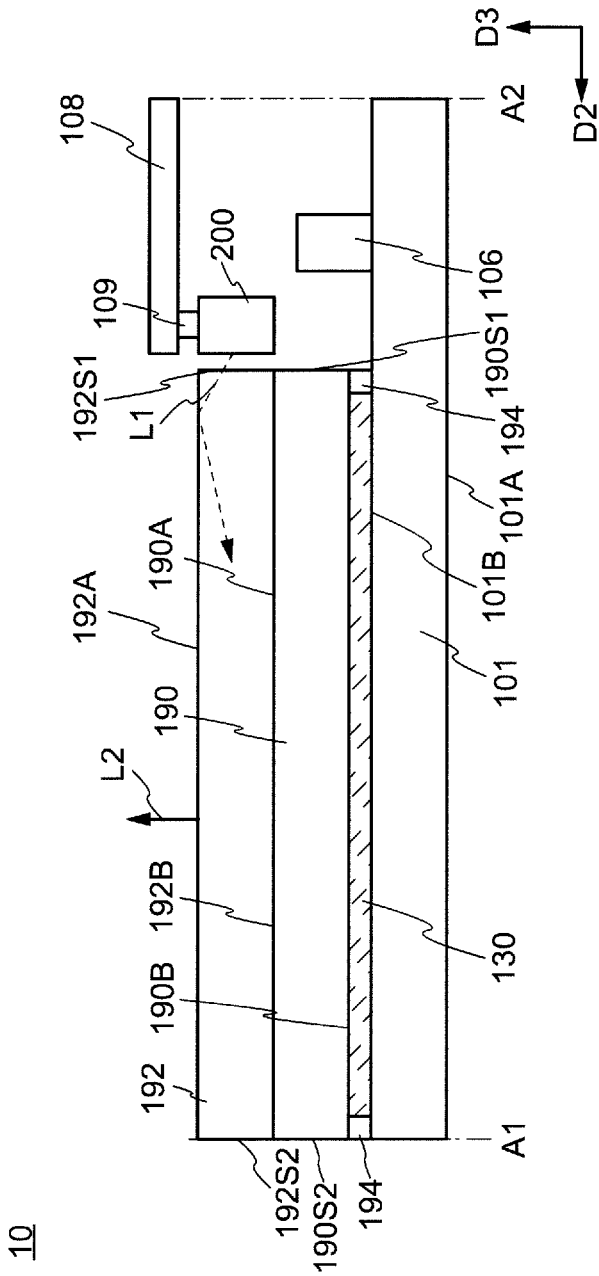
FIG. 21 is an end cross-sectional view showing another cross-sectional structure along the line A1-A2 shown in FIG. 1.

The display system 10 according to a third embodiment will be described with reference to FIG. 1 and FIG. 21. The display system 10 according to the third embodiment is different from the display system 10 according to the first embodiment in a path that guides the light of the light-emitting element 220. FIG. 21 is an end cross-sectional view showing another cross-sectional structure along the line A1-A2 shown in FIG. 1. The configuration and function of the display system 10 are not limited to the configuration shown in FIG. 21. Description of the same or similar components as those of FIG. 1 to FIG. 20 may be omitted.

As shown in FIG. 21, a second main surface 192B of a substrate 192 is provided on the first main surface 190A of the substrate 190. The lighting device 200 faces a first side surface 192S1 of the substrate 192. A second side surface 192S2 is provided parallel to a second side surface 190S2 of the substrate 190. The substrate 192 can guide the light L1 irradiated from the lighting device 200. The irradiated light L1 is incident on the display panel 100 from the first side surface 192S1. The first side surface 192S1 is a light incident surface.

The substrate 192 is made of the same materials as the substrate 101 and the substrate 190.

The light L1 irradiated from the lighting device 200, for example, is reflected by the first main surface 101A of the substrate 101 and a first main surface 192A of the substrate 192 and propagates in a direction away from the first side surface 192S1 (second direction D2). The light L1 propagating inside the substrate 101 and the substrate 192 is scattered by the pixel 103 having scattered liquid crystal molecules. The scattered light is referred to as the light L2. In this case, the incidence angle of the scattered light (scattered light L2) is smaller than the critical angle. Each of the light L2 is emitted to the outside from the first main surface 192A of the substrate 192 and the first main surface 101A of the substrate 101. The light L2 emitted to the outside from the first main surface 192A of the substrate 192 and the first main surface 101A of the substrate 101, respectively, is observed by the observer.

While the present invention has been described with reference to the drawings, the present invention is not limited to the above embodiments and can be appropriately modified without departing from the spirit of the present invention. For example, the addition, deletion, or design change of components, or the addition, deletion, or condition change of processes as appropriate by those skilled in the art based on a display system of the present embodiment are also included in the scope of the present invention as long as they are provided with the gist of the present invention. Furthermore, the embodiments described above can be appropriately combined as long as no contradiction is caused, and technical matters common to the embodiments are included in the embodiments even if they are not explicitly described.

Even if the effect is different from those provided by each of the above-described embodiments, the effect obvious from the description in the specification or easily predicted by persons ordinarily skilled in the art is apparently derived from the present invention.

What is claimed is:

1. A display system comprising:
   a display panel with a display area;
   a lighting device located facing one side of the display area and emitting light to the display panel;
   a correction coefficient generating circuit receiving a plurality of image data including first image data and second image data, generating a first correction coefficient based on a brightness of the first image data and generating a second correction coefficient based on a brightness of the second image data, and the first image data corresponding to a first image and the second image data corresponding to a second image adjacent to the first image and located on the opposite side of the lighting device to the first image;
   a multiplication circuit receiving at least the first image data and the second image data, receiving at least the first correction coefficient and the second correction coefficient from the correction coefficient generating circuit, generating first corrected image data using the first image data and the first correction coefficient, and generating second corrected image data using the second image data and the second correction coefficient;
   a display drive control unit receiving the first corrected image data and the second corrected image data from the multiplication circuit, and transmitting the first corrected image data and the second corrected image data to the display panel; and
   a display control unit; wherein
      the display control unit executes a first scan in which the image displayed on the display panel is scanned parallel to or substantially parallel to the direction in which the light is incident on the display panel, and executes a second scan in which the image is scanned perpendicularly or substantially perpendicular to the direction in which the light is incident on the display panel, and
      the correction coefficient generation circuit generates the first correction coefficient using the first image data corresponding to the first image scanned in the first scan and the second scan, and generates the second correction coefficient using the second image data corresponding to the second image scanned in the first scan and the second scan.

2. The display system according to claim 1, wherein the display drive control unit uses a switch at a desired timing to transmit the first corrected image data and the second corrected image data to the display panel.

3. The display system according to claim 1, wherein the display control unit calculates a correction width using an angle at which the light is incident and a distance from an incident surface of the display panel on which the light is incident, and
the correction coefficient generation circuit generates the first correction coefficient using the first image data, the first correction coefficient and the correction width, and generates the second correction coefficient using the second image data, the second correction coefficient and the correction width.

4. The display system according to claim 1, wherein the brightness of the first image data is larger than the brightness of the second image data, and
the correction coefficient generation circuit generates the first correction coefficient so that the brightness is smaller than the brightness of the first image data, and generates the second correction coefficient so that the brightness is smaller than the brightness of the second image data.

5. The display system according to claim 1, further comprising:
   a frame memory; wherein
   the frame memory stores the plurality of image data and transmits the plurality of image data to the correction coefficient generation circuit and the multiplication circuit.

6. The display system according to claim 1, wherein the display panel is a liquid crystal display panel driven by a field sequential drive method.

7. The display system according to claim 1, wherein the display panel is a liquid crystal display panel using a polymer-dispersed liquid crystal.

8. A method for driving a display system comprising:
   a display system including a display panel with a display area and a lighting device located facing one side of the display area and emitting light to the display panel;
   the method comprising:
      receiving a plurality of image data including a first image data and second image data; the first image data corresponding to the first image and the second image data located on the opposite side of the lighting device to the first image and corresponding to a second image adjacent to the first image;
      generating a first correction coefficient based on a brightness of the first image data;
      generating a second correction coefficient based on a brightness of the second image data;
      generating first corrected image data using the first image data and the first correction coefficient;
      generating second corrected image data using the second image data and the second correction coefficient;
      displaying an image corresponding to the first corrected image data and the second corrected image data to the display panel;
      executing a first scan in which the image displayed on the display panel is scanned parallel to or substantially parallel to the direction in which the light is incident on the display panel;
      executing a second scan in which the image is scanned perpendicularly or substantially perpendicular to the direction in which the light is incident on the display panel; and
      generating the first correction coefficient using the first image data corresponding to the first image scanned in the first scan and the second scan, and generates the second correction coefficient using the second image data corresponding to the second image scanned in the first scan and the second scan.

9. The method of the display system according to claim 8, further comprising:
   displaying the image corresponding to the first corrected image data and the second corrected image data to the display panel using a switch at a desired timing.

10. The method of the display system according to claim 8, further comprising:
    calculating a correction width using an angle at which the light is incident and a distance from an incident surface of the display panel on which the light is incident,
    generating the first correction coefficient using the first image data, the first correction coefficient and the correction width, and generating the second correction coefficient using the second image data, the second correction coefficient and the correction width.

11. The method of the display system according to claim 8, wherein
the brightness of the first image data is larger than the brightness of the second image data, and
the method includes generating the first correction coefficient so that the brightness is smaller than the brightness of the first image data, and generating the second correction coefficient so that the brightness is smaller than the brightness of the second image data.

12. The method of the display system according to claim 8, wherein
the plurality of image data is stored in a frame memory, and transmitted from the frame memory to a correction coefficient generation circuit and a multiplication circuit.

13. The method of the display system according to claim 8, wherein
the display panel is a liquid crystal display panel driven by a field sequential drive method.

14. The method of the display system according to claim 8, wherein
the display panel is a liquid crystal display panel using a polymer-dispersed liquid crystal.

* * * * *